United States Patent
Nishizawa (12)

(10) Patent No.: US 6,279,959 B1
(45) Date of Patent: Aug. 28, 2001

(54) OPTICAL DISCS, PRODUCING METHODS AND PRODUCTION APPARATUS OF THE OPTICAL DISCS

(75) Inventor: Akira Nishizawa, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/669,222

(22) Filed: Sep. 25, 2000

Related U.S. Application Data

(62) Division of application No. 09/168,250, filed on Oct. 8, 1998, now Pat. No. 6,168,207.

(30) Foreign Application Priority Data

Oct. 9, 1997 (JP) .................................................... 9/293495
Nov. 28, 1997 (JP) .................................................... 9/344320

(51) Int. Cl.$^7$ ................................................ B42D 15/00
(52) U.S. Cl. ............................ 283/67; 285/91; 285/114; 428/65.2; 369/44.24
(58) Field of Search ............................ 285/67, 70, 72, 285/86, 91, 113, 114, 901; 428/64.1, 64.4, 65.2; 369/275.1, 44.24, 280

(56) References Cited

U.S. PATENT DOCUMENTS 5,128,922 * 7/1992 Inui et al. ............................ 369/280
5,675,570 * 10/1997 Ohira et al. ........................ 369/275.1
5,999,504 * 12/1999 Aoki .................................. 369/44.13
6,024,455 * 2/2000 O'Neill et al. ...................... 283/91 X
6,168,207 * 1/2001 Nishizawa .............................. 283/91

* cited by examiner

Primary Examiner—Willmon Fridie, Jr.
(74) Attorney, Agent, or Firm—Anderson, Kill & Olick, P.C.

(57) ABSTRACT

The present invention provides an optical disc provided with a watermark inside, which is visible with naked eyes from a reproduction side of the optical disc, and the producing method and the production apparatus thereof. The optical disc comprises a transparent substrate having an information signal recorded surface, a reflective layer formed on the information signal recorded surface thereof, an adhesive layer formed on the reflective layer, a mask layer on the adhesive layer and a transparent dummy substrate on the mask layer stacked in this order. The adhesive layer is made of an adhesive of which curing speed is changed according to a controlled amount of radiation of ultraviolet rays. The watermark is recorded in the optical disc by irradiating the ultraviolet rays on the adhesive through the mask layer provided with light shielding members to cause the adhesive to be cured by controlling a curing speed of the adhesive corresponding to existence or nonexistence of the light shielding members.

36 Claims, 11 Drawing Sheets

A ~ E

OPTICAL DISCS, PRODUCING METHODS AND PRODUCTION APPARATUS OF THE OPTICAL DISCS

BACKGROUND OF THE INVENTION

This application is a divisional of 09/168250 now U.S. Pat. No. 6,168,207 filed Oct. 8, 1998.

FIELD OF THE INVENTION

The present invention relates to optical discs, producing methods and production apparatuses of the optical discs, and particularly, relates to plural substrate type optical disc composed of at least two substrates joined together, wherein information tracks and a watermark can be visually observed simultaneously from a reproduction side of the optical disc.

DESCRIPTION OF THE RELATED ART

Presently, the optical disc is widely used because of its vast amount of recording capacity and convenience of handling.

In an optical disc referred to as a compact disc (CD), an information signal is recorded on only one surface (information signal recording surface) thereof and the recorded information is reproduced by irradiating a laser beam from the other surface (signal reproducing surface) side.

Recently, forgeries of optical discs have been rampant in the market. Thus, the disc sales industry is making a great effort to develop disc forgery prevention technics.

For the purpose of preventing the disc forgery and increasing an amount of recording capacity, there has been recently developed a new type optical disc referred to as a digital versatile disc (DVD, or referred to as digital video disc). However, the countermeasure employed therein is not very effective to prevent forgeries of the optical disc.

Specifically, the countermeasure thereof is as follows.

Such an optical disc has two substrates joined together with an adhesive and one of the substrates has an information recording surface on which an information signal is recorded. Upon fabrication, on the information recording surface, there is provided with a mark, a picture, letter or the like, each having a size being visually observable in the production process thereof.

When a forgery of the optical disc appears in the circulation market, it is possible to identify the forgery from the genuine one by visually inspecting from the reproduction side of the DVD, the watermark formed as a mark, a picture or a letter formed in an area of the information tracks spirally or coaxially formed.

When the watermark is visually identified, the DVD is genuine, and when not visible, such a DVD is the forgery. Thus, it is possible to prevent forgery by rejecting it from the market.

The methods for forming such a watermark are disclosed, for instance, in Japanese Patent Laid-open Publication 59-177739, Japanese Patent Laid-open Publication 2-179941, Japanese Patent Laid-open Publication 8-31020, Japanese Patent Laid-open Publication 8-55370, and Japanese Patent Laid-open Publication 9-63135.

However, in the methods of the prior arts, the watermark is directly formed on the information signal recording surface of the optical disc as uneven steps (juts and dents) of the mark, picture, letter or the like, each having a size capable of being visually observed.

Accordingly, it is easy to produce a forgery of this kind of optical disc by duplicating the information signal surface thereof precisely, resulting in a weak countermeasure against the forgery.

SUMMARY OF THE INVENTION

Accordingly, a general object of the present invention is to provide an optical disc and producing method thereof, in which the above disadvantages have been eliminated.

A specific object of the present invention is to provide an optical disc carrying a watermark having a forgery prevention effect and the producing method thereof without providing any physically uneven steps on the information disc because the watermark disappears upon producing the forgery of an optical disc.

An another and more specific object of the present invention is to provide an optical disc producing method for producing an optical disc comprising a transparent substrate having an information signal recorded surface, a reflective layer formed on the information signal recorded surface thereof, an adhesive layer formed on the reflective layer and a dummy transparent substrate on the adhesive layer stacked in this order, the method comprising the steps of: forming the reflective layer on the information signal recorded surface of the transparent substrate: coating an adhesive on the reflective layer to form the adhesive layer, wherein a curing speed of the adhesive is changeable according to a controlled amount of irradiation of electromagnetic radiation rays; disposing the dummy transparent substrate on the transparent substrate sandwiching the reflective layer and the adhesive layer; disposing a mask member over a top surface of the dummy transparent substrate, wherein the mask member has a specific masking pattern for partially shielding the electromagnetic radiation rays; and irradiating the electromagnetic radiation rays on the adhesive layer through the mask member to cause the adhesive to be cured by controlling an amount of irradiation of the electromagnetic radiation corresponding to the specific masking pattern, hereby a position of the reflective layer is microscopically and partially displaced corresponding to the specific masking pattern from an original position of the reflective layer, and thus displaced reflective layer visually exhibits a watermark having the specific masking pattern after the adhesive is cured.

Other and more specific object of the present invention is to provide an optical disc producing method for producing an optical disc comprising a transparent substrate having an information signal recorded surface, a reflective layer formed on the information signal recorded surface thereof, an adhesive layer formed on the reflective layer and a dummy transparent substrate on the adhesive layer stacked in this order, the method comprising the steps of: forming the reflective layer on the information signal recorded surface of the transparent substrate; coating an adhesive on the reflective layer to form the adhesive layer, wherein a curing speed of the adhesive is changeable according to a controlled amount of irradiation of electromagnetic radiation rays; disposing the dummy transparent substrate on the transparent substrate sandwiching the reflective layer and the adhesive layer; forming a mask pattern directly on a top surface of the dummy transparent substrate, wherein the mask pattern has a specific shape for partially shielding the electromagnetic radiation rays; and irradiating the electromagnetic radiation rays on the adhesive layer through the mask pattern formed on the dummy transparent substrate to cause the adhesive to be cured by controlling an amount of irradiation of the electromagnetic radiation rays corresponding to the specific shape, whereby a position of the reflective layer is microscopically and partially displaced corresponding to the specific shape from an original position of the reflective layer, concealing the mask pattern from the dummy transparent substrate; and thus displaced displacement of the reflective layer visually exhibits a watermark having the specific shape after the adhesive is cured.

Other and more specific object of the present invention is to provide an optical disc producing method for producing an optical disc comprising a transparent substrate having an information signal recorded surface, a reflective layer formed on the information signal recorded surface thereof, an adhesive layer formed on the reflective layer, a mask layer on the adhesive layer and a dummy transparent substrate on the mask layer stacked in this order, the method comprising the steps of: forming the reflective layer on the information signal recorded surface of the transparent substrate; coating an adhesive on the reflective surface to form the adhesive layer, wherein a curing speed of the adhesive is changeable according to a controlled amount of irradiation of electromagnetic radiation rays; disposing the dummy transparent substrate on the adhesive layer sandwiching the mask layer therebetween, wherein the mask layer has a specific pattern for partially shielding the electromagnetic radiation rays; and irradiating the electromagnetic radiation rays on the adhesive layer through the mask layer to cause the adhesive to be cured by controlling an amount of irradiation of the electromagnetic radiation rays corresponding to the specific pattern, whereby a position of the reflective layer is microscopically displaced corresponding to the specific pattern, and thus displaced reflective layer visually exhibits a watermark having the specific pattern after the adhesive is cured.

Other and more specific object of the present invention is to provide an optical disc producing method for producing an optical disc comprising a first substrate having an information signal recorded surface, a reflective layer formed on the information signal recorded surface thereof, an adhesive layer formed on the reflective layer, mask means having masking members on the adhesive layer and a second substrate on the mask layer stacked in this order, the method comprising the steps of: forming the reflective layer on the information signal recorded surface of the first substrate; coating an adhesive on the reflective surface to form the adhesive layer, wherein a curing speed of the adhesive is changeable according to a controlled amount of irradiation of electromagnetic radiation rays; disposing the second substrate on the first substrate sandwiching the reflective layer and the adhesive layer; disposing mask means having the mask members on one surface of the second substrate; irradiating the electromagnetic radiation rays on the adhesive through the mask means to cause the adhesive to be cured by controlling the curing speed of the adhesive responsive to existence and nonexistence of the mask members, whereby a watermark is recorded in the optical disc corresponding to the existence and nonexistence of the mask members after the adhesive is cured.

Other and more specific object of the present invention is to provide an optical disc production apparatus for producing an optical disc comprising a first substrate having an information signal recorded surface, a reflective layer formed on the information signal recorded surface thereof, an adhesive layer formed on the reflective layer, a mask layer on the adhesive layer and a second substrate on the mask layer stacked in this order, the adhesive layer made of an adhesive of which curing speed is changed according to a controlled amount of irradiation of an electromagnetic radiation rays, the apparatus comprising: an electromagnetic radiation rays source; mask means provided with mask members for partially shielding the electromagnetic radiation rays emitted from the electromagnetic radiation rays source; and disc mounting means for mounting the optical disc and being irradiated with the electromagnetic radiation rays through the mask means; wherein a watermark is recorded in the optical disc by irradiating the electromagnetic radiation rays on the adhesive through the mask means to cause the adhesive to be cured by controlling the curing speed of the adhesive corresponding to an existence and nonexistence of the mask members.

DETAILED DESCRIPTION OF THE PREFERRED EMBODIMENTS

Next, a description is given of an outline of optical discs and the producing methods of first to fifth embodiments of the present invention referring to FIGS. 1 to 11.

Figure 1:
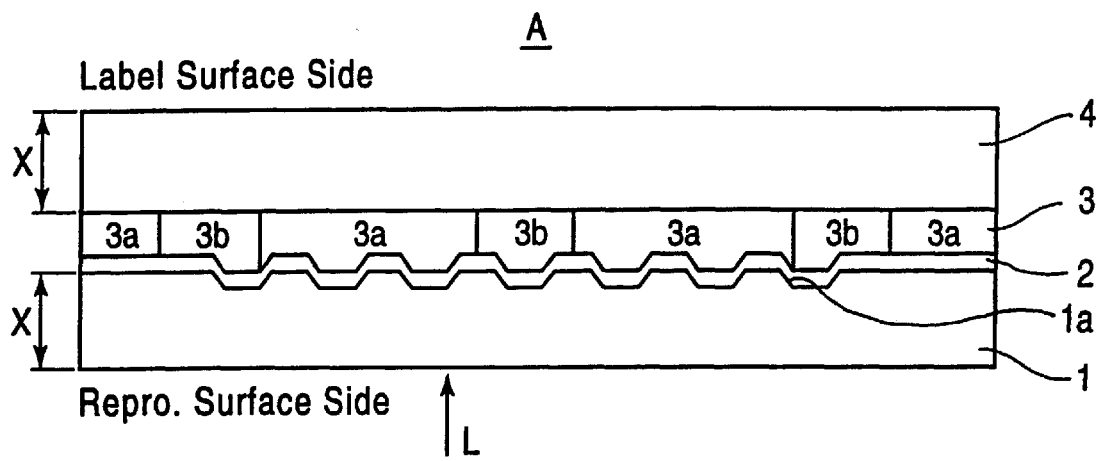
FIG. 1 is a sectional view for explaining a structure of an optical disc of a first embodiment of the present invention.
Figure 2:
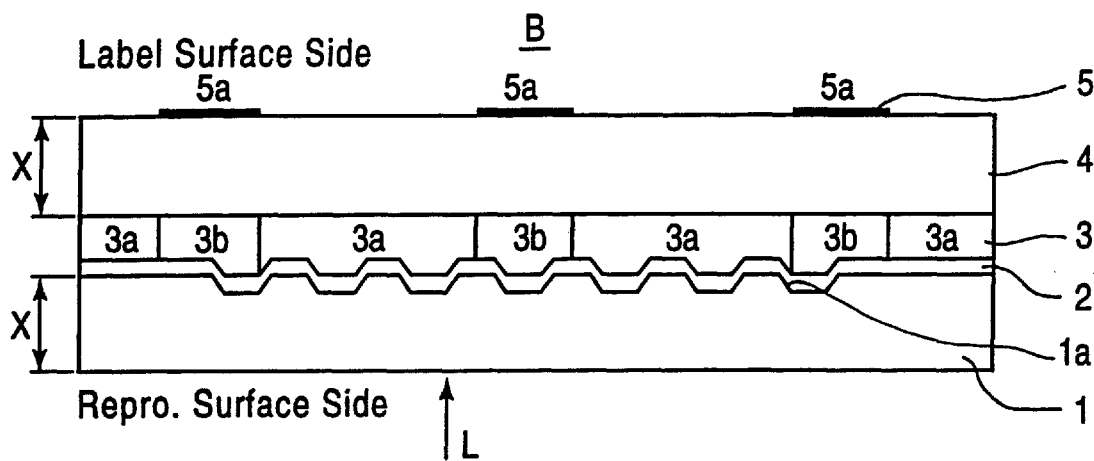
FIG. 2 is a sectional view for explaining a structure of an optical disc of a second embodiment of the present invention.
Figure 3:
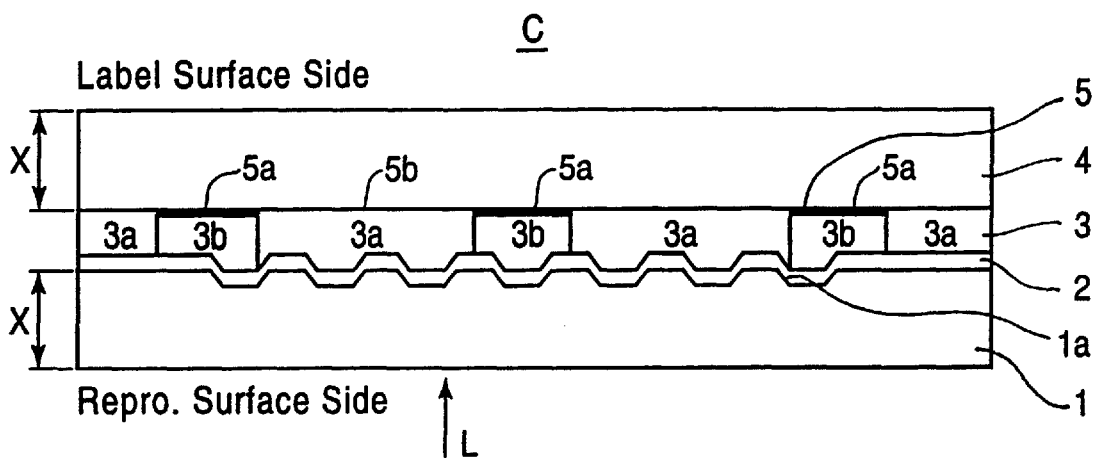
FIG. 3 is a sectional view for explaining a structure of an optical disc of a third embodiment of the present invention.
Figure 4:
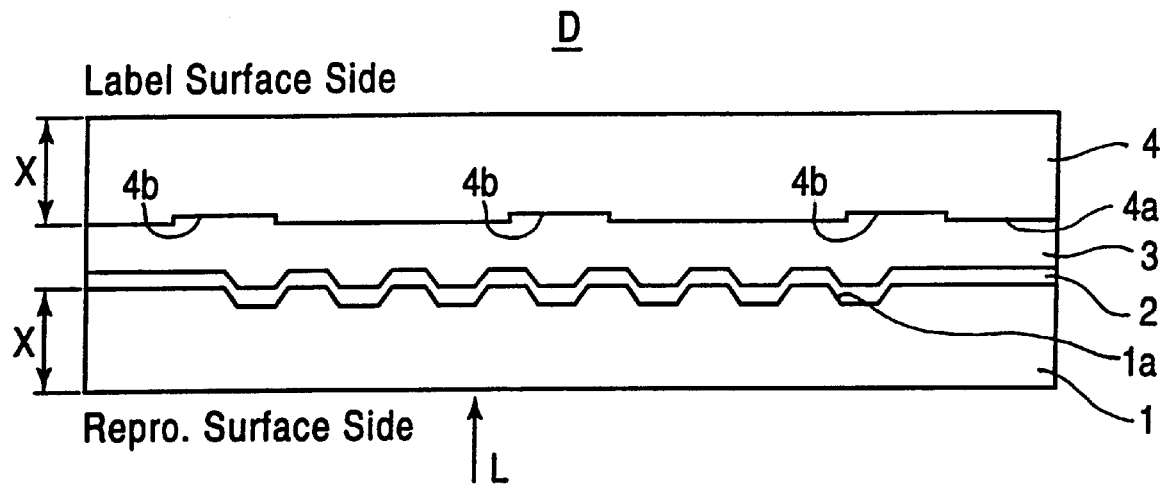
FIG. 4 is a sectional view for explaining a structure of an optical disc of a fourth embodiment of the present invention.
Figure 5:
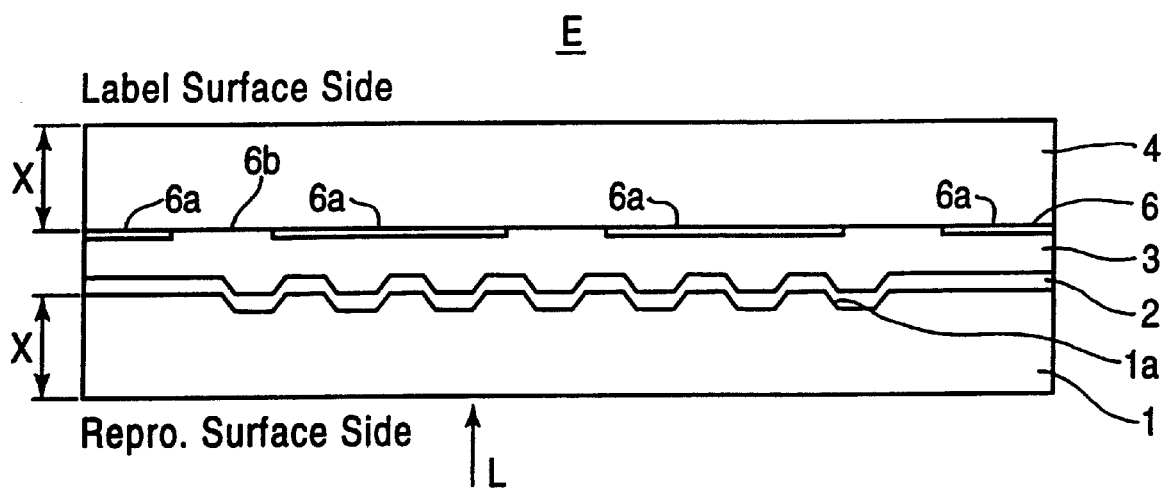
FIG. 5 is a sectional view for explaining a structure of an optical disc of a fifth embodiment of the present invention.
Figure 6:
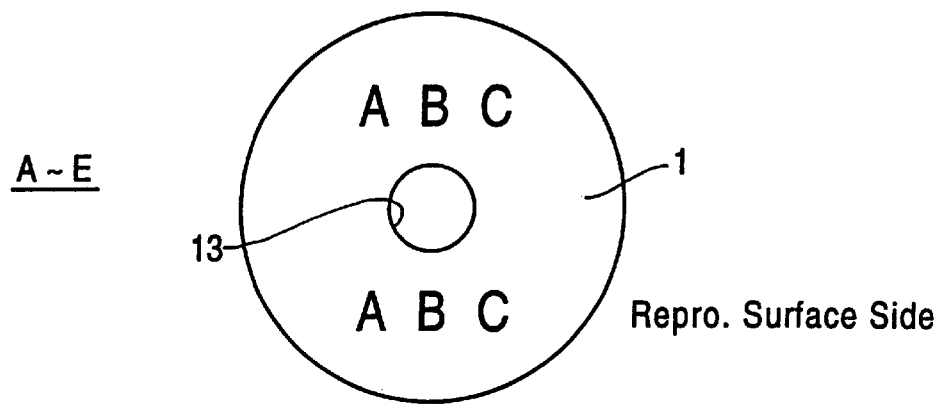
FIG. 6 is a plan view for explaining a watermark "A B C" viewed from a reproduction side of the optical disc.
Figure 7:
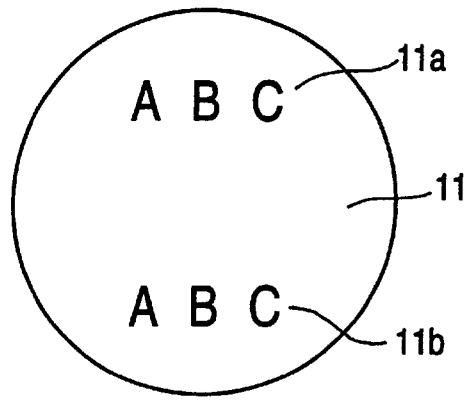
FIG. 7 is a plan view for explaining a light shielding filter used in a producing method of the present invention.
Figure 8:
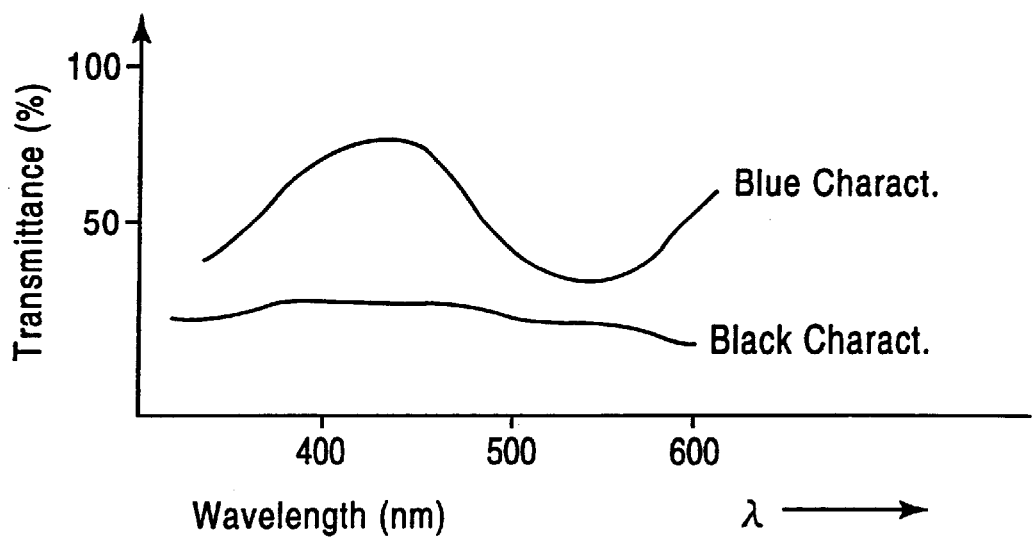
FIG. 8 is a graph for explaining transmittance of black and blue filters with respect to light wavelength.
Figure 9:
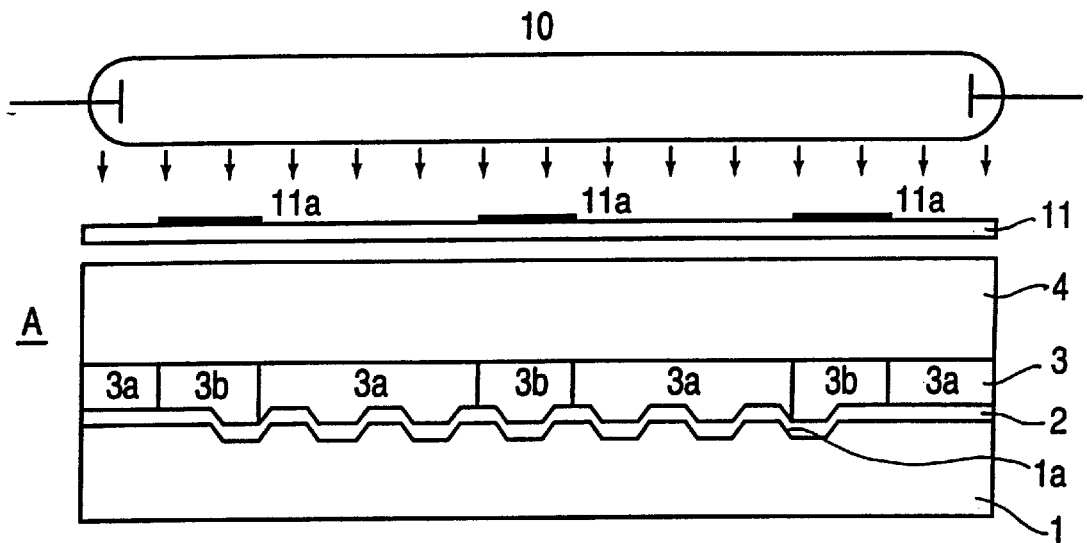
FIG. 9 is a sectional view for explaining a producing method of the optical disc of the first embodiment in the present invention.
Figure 10:
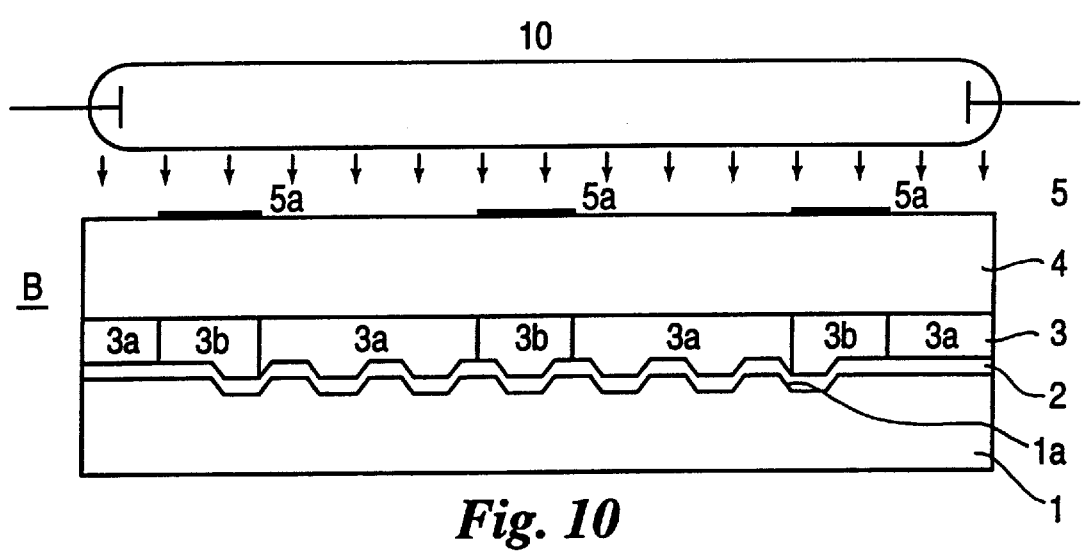
FIG. 10 is a sectional view for explaining a production method of the optical disc of the second embodiment in the present invention.
Figure 11:
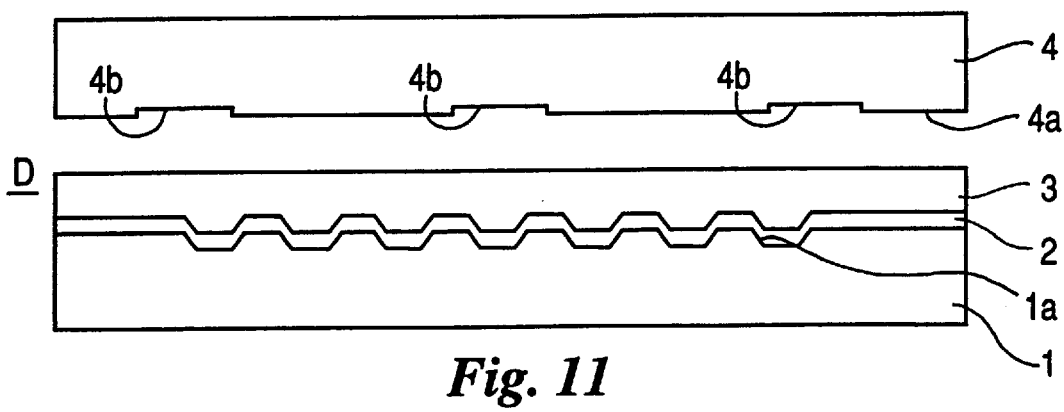
FIG. 11 is a sectional view for explaining a producing method of the optical disc of the third embodiment in the present invention.

FIG. 1 is a sectional view for explaining a structure of an optical disc of a first embodiment of the present invention;

FIG. 2 is a sectional view for explaining a structure of an optical disc of a second embodiment of the present invention;

FIG. 3 is a sectional view for explaining a structure of an optical disc of a third embodiment of the present invention;

FIG. 4 is a sectional view for explaining a structure of an optical disc of a fourth embodiment of the present invention;

FIG. 5 is a sectional view for explaining a structure of an optical disc of a fifth embodiment of the present invention;

FIG. 6 is a plan view for explaining a watermark "A B C" viewed from a reproduction side of the optical disc;

FIG. 7 is a plan view for explaining a light shielding filter used in a producing method of the present invention;

FIG. 8 is a graph for explaining blue and black color spectrum characteristics with respect to the light transmittance;

FIG. 9 is a sectional view for explaining a producing method of the optical disc of the first embodiment in the present invention;

FIG. 10 is a sectional view for explaining a producing method of the optical disc of the second embodiment in the present invention; and FIG. 11 is a sectional view for explaining a producing method of the optical disc of the third embodiment in the present invention.

The plural substrate type optical disc of the present invention is comprised of two substrates joined together by using an adhesive.

According to optical discs A, B, C, D and E which respectively correspond to first, second, third, fourth and fifth embodiments of present invention as shown in FIGS. 1 to 5, each of them comprises a transparent substrate 1 having an information signal recorded surface 1a on which information signal tracks are spirally or coaxially formed, a reflective layer 2 formed on the information recorded surface 1a, an adhesive layer 3 on the reflective layer 2 and a dummy transparent substrate 4 having no information signal recorded surface facing the adhesive layer 3. In the drawings, each of the transparent substrate 1 and the dummy transparent substrate 4 has a thickness of 0.6 mm which is represented by a reference character x, and a reference character L designates a direction of an incident laser beam used for reproducing the information signal from the information signal recorded surface 1a thereof.

Next, the description is given of the basic principle of a watermark of the present invention referring to FIGS. 1 and 2.

In the optical discs A and B, the watermark of the present invention is recorded as a distribution of positional displacement of the reflective layer 2 by causing the reflective layer 2 to be microscopically displaced from the original position corresponding to an inner stress distribution developed within the adhesive interposed between the reflective layer 2 and the dummy transparent substrate 4. Thus, the watermark is visually observed with naked eyes from the reproduction side of the optical disc, as the reflected light from the distribution of the positional displacement of the reflective layer 2.

Accordingly, it should be noted that in the present invention, the watermark is not directly recorded on the information signal recorded surface 1a of the transparent substrate 1.

The above distribution of positional microscopic displacement of the reflective layer 2 is formed by developing a stress distribution with the adhesive layer 3 corresponding to a desired pattern of watermark, which is caused in an adhesive layer forming process.

Specifically, referring to FIG. 1, the stress developed in a part 3a in the adhesive layer 3 is different from that developed in another part 3b therein, resulting in a stress distribution pattern having two dimensional varied stresses within the adhesive layer 3. This stress distribution may be developed corresponding to, for instance, a light shielding filter 11 having light shielding members 11a shown in FIG. 9. On the other hand, in FIG. 2, the stress distribution pattern is developed corresponding to printed parts 5a as the light shielding member provided on the dummy transparent substrate 4.

In order to develop the stress distribution in the adhesive layer 3, a partial difference of a curing speed in the adhesive can be applied.

On the other hand, in the optical discs C~E shown in FIGS. 3 to 5, a portion of the reflective layer 2 contacting with the part 3b of the adhesive layer 3 corresponding to the watermark is microscopically displaced to the adhesive layer side from the position sticking to the information signal recorded surface 1a, so that the watermark is recorded. Here, a difference of adherence pressure applied to the adhesive layer 3 is utilized.

In the optical discs A, B having such structures, when a light incidents on the transparent substrate 1 from the reproducing side thereof and is reflected by the reflective layer 2, there occurs a phase difference between a first light reflected from a first portion of the reflective layer 2 contacting with the adhesive portion 3b corresponding to the watermark and a second light reflected from a second portion of the reflective layer 2 contacting with the adhesive portion 3a which does not correspond to the watermark in the reflective layer 2. Thereby, it is possible to visually observe the phase difference as the watermark.

In the above description, the first portion of a reflective layer 2 contacting with the adhesive portions 3b corresponds to the watermark, however, the second portion of the reflective layer 2 contacting with the adhesive portions 3a may be made to correspond to the watermark.

Next, a description is given of the producing method of the optical disc in the present invention.

In the dual substrate type optical disc, the optical disc is obtained by bonding two units of single substrate (referred to as a "substrate" hereinafter) together with an adhesive.

As to bonding methods of the substrates, they are classified into several ones by methods how to apply the adhesive on the surface of the substrates.

As one of the basic methods, there is one so-called "a hot-melt coating method", wherein vinyl acetate resin or ethylene vinyl acetate resin having a low viscosity being hot-melted in a high temperature is coated on the surfaces of the two substrates to be bonded by using a coating roller, and the two substrates are pressed each other for a while after being bonded together.

Next, in "a spin bonding method", one of the two substrates is placed on a spin-table of a spinner, and a liquid resin such as ultraviolet rays curing resin is dropped on the surface of the substrate being rotated. Then, the other of the two substrates is placed on the coated resin surface thereof. After the ultraviolet rays curing resin has been spread between the two facing surfaces thereof, the spin-table is rotated in a high speed so that the resin is spread throughly between the surfaces thereof. After that, the ultraviolet rays are irradiated on the resin so as to be cured.

Further, in "a sheet bonding method", a double-sided adhesive sheet is used to bond the two substrates, wherein one surface of the double-sided adhesive sheet is bonded to one of the two substrates and the other substrate is stacked on the other surface of the double-sided adhesive sheet, and is pressed so as to be bonded thereto without developing bubbles between the surfaces of the substrates and the double-sided adhesive sheet.

In the present invention, in the bonding process for the two substrates, the adhesive is cured so as to have a stress distribution corresponding to the watermark, for instance, by partially changing the curing speed of the ultraviolet rays curing resin corresponding to the watermark.

Thereby, it is especially effective to prevent such forgery producing methods as the information signals are directly duplicated from the original one. In other words, this method is more effective compared with the conventional forgery prevention method where the uneven steps are formed on the information signal recorded surface to prevent the forgery thereof, because the uneven steps in the prior art can be readily duplicated along with the information signal. According to the present invention, it is possible to completely prevent the forgery of the optical disc using a method of a replica from the original one, because it is impossible to produce the replica of the watermark having no uneven steps.

Next, the producing methods of the optical disc in the present invention are explained in detail.

First, the description is given of a mechanism of forming the watermark in case that the spin coating method is employed.

In the spin coating method, a state of the stress distribution can be produced by changing partially the curing speed of electromagnetic radiation rays curing resin such as the ultraviolet rays curing resin interposed between the surfaces of the two substrates. This is realized by controlling irradiation intensity of the light beam to be partially changed therebetween.

Specifically, as shown in FIG. 9, when the transparent substrate 1 is bonded to the dummy substrate 4 by curing, a light shielding filter 11 for appropriately shielding the ultraviolet rays is disposed between the dummy substrate 4 and an ultraviolet rays irradiation apparatus 10 so as to develop a difference of light intensity in the bonded surfaces thereof.

Here, as the watermark, a mark, a picture, a letter, a symbol and/or a number are/is written on the light shielding filter 11 in light shielding ink. Thereby, it is possible to produce a curing speed difference between parts written in the light shielding ink and parts free from the light shielding ink. Thus, there is developed a stress distribution to the bonded surfaces of the substrates 1, 4, resulting in a microscopic displacement of the reflective membrane (reflective layer 2) from original positions in a vertical direction.

As a result, the above phenomenon can be visually observed with the naked eyes as the watermark when viewed from the reproduction side of the optical disc A.

FIG. 8 is a graph for explaining blue and black color spectrum characteristics with respect to the light transmittance.

Referring to FIG. 8, as the light shielding filter 11, there is used a light shielding filter written in light shielding ink having a black color spectrum characteristic, wherein its transmittance of light having a wavelength of not more than 450 nm is about 10% as shown in FIG. 8.

Thus, it is possible to record the watermark giving an individual number (a manufacturing number) in the optical disc A for every optical disc A by allowing the light shielding filter 11 to be successively printed with a serial number (as the light shielding member 11a) in the light shielding ink.

Thereby, a production control and an stock control of such discs become convenient.

The optical disc A shown in FIG. 1 is produced by the method mentioned above.

Next, a description is given of another producing method as follows.

Referring to FIG. 10, when the transparent substrate 1 and the dummy transparent substrate 4 having no information signal recorded surface are bonded together by using the ultraviolet rays curing resin, a mark, a picture, a letter, a symbol and/or a number are/is printed on the top surface (label side) or the bottom (adhesive Layer side) of the dummy transparent substrate 4 in a light shielding ink 5.

The light shielding ink 5 has a spectrum characteristic which is color dependent. Thus, the transmittance of the ultraviolet rays is different for respective colors. Therefore, from the reason mentioned in the foregoing, it is possible to form the watermark in the optical disc B because the light shielding ink 5 which appropriately shields ultraviolet rays is provided between the ultraviolet rays irradiation apparatus 10 and the dummy transparent substrate. In this case, the printed parts 5a exhibiting a pattern of the mark, picture, letter, symbol and/or number for producing the watermark are/is preferably concealed after the ultraviolet rays curing resin has been cured. This concealing work can be done in a subsequent ordinary label printing process.

The optical discs B, C produced according to the above method are shown in FIGS. 2 and 3, wherein the optical disc B shown in FIG. 2 is one that the printed parts 5a of the mark, picture, letters, symbols and numbers are not concealed yet.

In the above spin bonding method, the watermark is formed by developing a stress distribution in the ultraviolet rays curing resin.

Next, the description is given of other method, i.e., the sheet bonding method (screen print bonding method), wherein a stress distribution is developed by using the ultraviolet rays curing resin as well as for the spin bonding method.

Specifically, as shown in FIG. 11, there is preliminarily provided unevenness 4a, 4b on a bottom (facing to the adhesive layer) of the dummy transparent substrate 4 corresponding to the mark, picture, letter, symbol or number as the watermark. The unevenness 4a, 4b can produce the watermark by changing the stress of the adhesive layer 3. When the dummy substrate 4 having a flat bottom contacts with the adhesive layer 3, a thickness of the adhesive layer 3 stays constant, resulting in a constant stress in the adhesive layer 3. However, when such unevenness 4a, 4b are preliminarily provided on the bottom of the dummy substrate 4, it produces the stress distribution in the adhesive layer 3, resulting in that the stress distribution becomes visible as the watermark from the reproduction side of the transparent substrate 1 through the adhesive layer 3 due to the fact that minute displacement of the reflective layer 2 are developed corresponding to the stress distribution.

The optical disc D produced by the method mentioned above is shown in FIG. 4.

As other method referring to FIG. 5, it is possible to employ a sheet where the mark, picture, letter, symbol and number are cut out from the sheet or printed so as to produce unevenness 6a, 6b as a mask layer 6 provided between the adhesive layer 3 and the bottom of the dummy substrate 4. Thereby, it is possible to obtain the same effect as that in the case where the unevenness 4a, 4b is formed on the bottom of the dummy substrate 4.

In the above, when the unevennesses 6a, 6b are printed, it is preferable to employ a screen printing method where the ink layer can be made thick enough to produce the evenness 6a, 6b.

The optical disc E produced by the method mentioned above is shown in FIG. 5.

Meanwhile, when the optical discs A to E having the watermark formed by the methods mentioned above are reproduced, it is necessary to obtain the same reproduction characteristics as those of ordinary DVD (Digital Video Disc) having no watermark.

Next, as an example of the reproduction characteristics, a description is given of a confirmation of an amount of focus error of an optical head in the optical disc reproduction apparatus.

Generally, when such a watermark is visually observed from the reproduction side of the optical disc, a series of pits of the optical information signal recorded on the information signal recorded surface 1a is observed to be distorted because of the microscopic displacement of the reflective membrane (reflective layer 2) due to the stress variation developed in the adhesive layer 3.

Upon the reproduction of the optical disc, this distortion causes a reproduction problem of the information signal because of a strain of the reflective layer 2. The watermark is desired to be formed at a maximum level so as to be observed securely within a limit that the information signal is normally reproduced by the optical head.

When the balance is upset, this unbalance causes focus errors of the optical head, resulting in a difficulty in reproduction of the information signal.

Next, an optical disc producing process according to representative one of the first to fifth embodiments in the present invention is further explained in detail.

Fast, the transparent substrate 1 having a thickness of 0.6 mm and a diameter of 120 mm was prepared. On its information signal recorded surface 1a, there were spirally or coaxially formed information signal tracks of a series of pits having a track pitch of 0.74 $\mu$m and the smallest pit length of 0.4 $\mu$m. The transparent substrate 1 was made from a polycarbonate resin by using an injection molding system.

The dummy transparent substrate 4 was formed to have the same thickness and diameter as those of the transparent substrate 1.

On the information signal recorded surface 1a of the transparent substrate 1 there was formed a reflective layer 2 of aluminum having a thickness of 60 nm by a vacuum deposition method.

On the spin-table of the spinner, the transparent substrate 1 formed with the reflective layer 2 was placed by causing the reflective layer 2 to face upward. The ultraviolet rays curing resin was dropped circularly on the reflective layer 2 by an amount of 3 ml.

After the ultraviolet rays curing resin was appropriately spread on the reflective layer 2, the dummy transparent substrate 4 was placed on the transparent substrate 1 sandwiching the resin before it cured without developing bubbles in the resin. Then, the spinner was rotated to obtain a desired thickness of the adhesive layer 3 interposed between the transparent substrate 1 and the dummy transparent substrate 4. The substrates 1 and 4 bonded together were carefully taken out from the spinner not to slip off from each other because the resin did not cure yet.

Then, the light shielding filter 11 was placed on the top surface (the label side) of the dummy transparent substrate 4.

The light shielding filter 11 was formed as follows.

Polyethylene terephthalate resin film (PET film) having a thickness of 100 $\mu$m was cut out into a round sheet having a diameter of 120 mm. As shown in FIG. 7, on a surface of the sheet, a mark (as the light shielding member) a shown with "A B C" was written in black ink and another mark (as light shielding member) 11b shown with "A B C" was written in blue ink below the mark 11a, resulting in the light shielding filter 11.

The light shielding filter 11 was placed on the substrate 1 and the dummy transparent substrate 4 coupled together before curing, and the ultraviolet rays were irradiated on the substrates through the light shielding filter 11 to cure the resin by using an ultraviolet rays irradiation apparatus having an ultraviolet rays lamp as mentioned hereinafter.

The contraction of the resin upon curing caused a stress distribution in the resin interposed between the substrates 1 and 4, resulting in the watermark due to a microscopic displacement of the reflective layer 2 as mentioned in the foregoing.

Upon a visual evaluation of the watermark, the watermark corresponding to the mark 11a written in black ink on the light shielding filter 11 could be clearly observed. On the other hand, the watermark corresponding to the mark 11b written in blue ink was not so clearly observed compared with the watermark corresponding to the mark 11a, however, the watermark itself was identified as it was. It should be noted that it is possible to allow the watermark to have a clear gradation by changing the color of the mark (as the light shielding member) to be used.

Upon a reproduction evaluation of the optical disc, the output waveform of the optical reproduction signal from the watermark corresponding to the mark 11a written in black ink was slightly disturbed, however, it was not a problem to the practical use.

On the contrary, the output waveform of thereof from the watermark corresponding to the mark 11b written in blue ink was not disturbed at all, and the reproduction was normally performed.

After the transparent substrate 1 was separated from the dummy transparent substrate 4, a replica was taken from the information signal recorded surface 1a of the transparent substrate 1. However, the watermark had disappeared from the replica.

Further, a master cutting was performed to attempt the optical disc duplication from the reproduced signal by inputting the output waveform of the optical disc to an optical modulation device of a cutting machine. Result was that the watermark disappeared from the duplicated optical disc.

As a result, it was confirmed that the watermark can not be duplicated at all in both physical and electronic duplication attempts.

According to the optical disc of the present invention, the watermark is built in as a microscopic displacement distribution of the reflective layer by microscopically displacing positions of the reflective layer corresponding to the watermark having a specific shape without providing any unevennesses steps on the outer surfaces of the disc separated.

Accordingly, when the transparent substrate is separated from the dummy transparent substrate to make the replica from the information signal recorded surface of the transparent substrate, the watermark depending on the stress distribution between the reflective layer and the adhesive layer is extinct because of the extinction of the stress distribution.

As a result, the optical disc duplicated from the original one has no watermark. Thus, it is possible for users to distinguish the false optical discs from the genuine ones. These facts contribute to securely prevent the forgery of the optical disc.

Next, a description is given of optical disc production apparatuses of an optical disc according to the present invention.

Before the description thereof, a preferable embodiment of the optical disc is explained.

Figure 12:
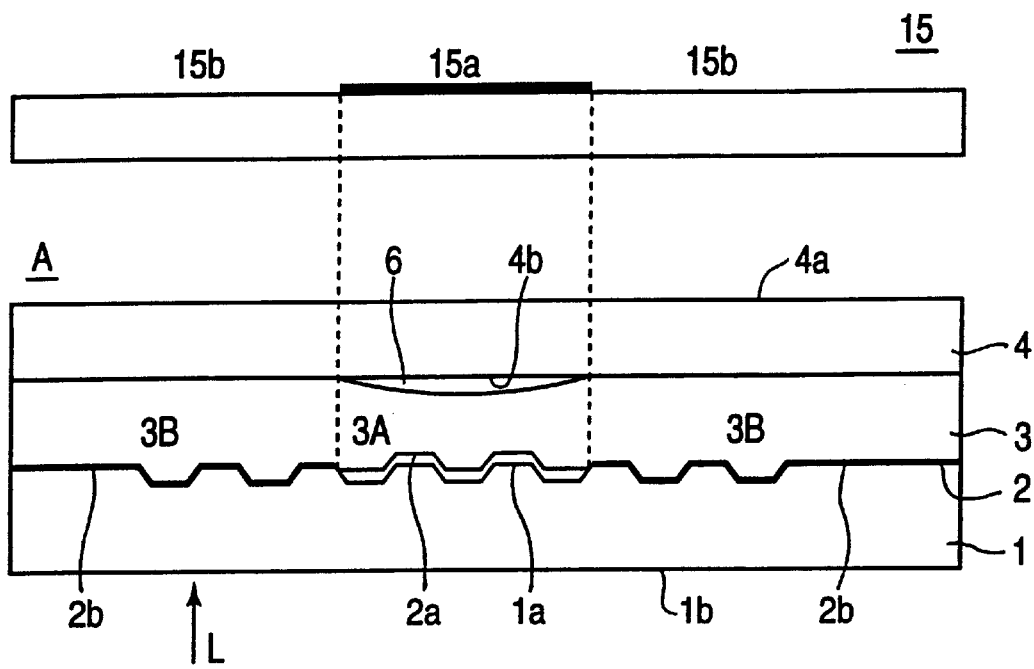
FIG. 12 is a schematic view for explaining an optical disc having a watermark produced by using producing apparatuses according to the present invention.

FIG. 12 is a schematic view for explaining an optical disc having a watermark produced by using optical disc production apparatuses according to the present invention, wherein like reference characters designate like or corresponding parts as mentioned in the first to fifth embodiments in the foregoing.

Optical disc A comprises a transparent substrate 1, a reflective layer 2, an adhesive layer 3 and a dummy transparent substrate 4, which are stacked in this order.

One surface of the transparent substrate 1 is an information signal recorded surface 1a, and from the other surface 1b thereof a laser beam is irradiated in a direction shown with L to reproduce the information signal from the surface 1a. On the information signal recorded surface 1a, information signal tracks are coaxially or spirally formed. The information signal tracks have at least a form selected from a group of pits, grooves and lands.

For instance, when the optical disc of the present invention is fabricated as DVD-ROM, the information signal tracks are made of pits and mirror. In the case of DVD-RAM, the information signal tracks are made of grooves or lands, and in the case of DVD-R or DVD-RW, the information signal tracks are made of grooves.

On the information signal recorded surface 1a, a reflective layer 2 is formed being contacted therewith. The adhesive used for the adhesive layer 3 is an ultraviolet rays curing resin. On the dummy transparent substrate 4, there is not formed the information signal recorded surface 1a.

As shown in FIG. 12, in the optical disc A having abovementioned structure of the present invention, marks, pictures, letters, symbols and numerals having sizes capable of being visually observed are built as a watermark within the adhesive layer 3.

In order to form the watermark in the optical disc A, a light shielding mask 15 is used. The light shielding mask 15 has light shielding members 15a composed of the marks, pictures, letters, symbols and/or numerals each having a size capable of being visually observed, and a reference character 15b designates a blank portion of the light shielding mask 15 where the light shielding members 15a is not provided. Further, it is possible to form a reversal of the watermark, i.e. a negative watermark by providing it as the blank portion 15b instead of the light shielding members 15a composed of the marks, pictures, letters, symbols and/or numerals each having a size capable of being visually observed as the blank portion 15b of the light shielding mask 15.

Upon curing a liquid ultraviolet rays curing resin for bonding the transparent substrate 1 having the reflective layer 2 thereon to the dummy substrate 4, such a light shielding mask 15 is used along with the ultraviolet rays.

Specifically, as shown in FIG. 12, the light shielding mask 15 is disposed above the dummy transparent substrate 4, and the ultraviolet rays (not shown) are irradiated over the light shielding mask 15. Thereby, the ultraviolet rays are irradiated through the light shielding mask 15 and the dummy transparent substrate 4 at a portion 3B of the ultraviolet rays curing resin except for a shadowed portion 3A where the shade of the light shielding member 15a of the light shielding mask 15 is projected.

As a result, in the adhesive layer 3, there occurs both the portion 3B irradiated with the ultraviolet rays and the shadowed portion 3A without the irradiation thereof. Of course, the ultraviolet rays from the portion 3B partially reach the shadowed portion 3A.

Thereby, there is developed a curing speed difference between the shadowed portion 3A and the portion 3B in the adhesive layer 3.

The above watermark results in the curing speed difference of the ultraviolet rays curing resin in the adhesive layer 3.

Specifically, when the resin at the shadowed portion 3a is cured, the reflective layer 2 closely contacted with the transparent substrate 1 is pulled by the adhesive layer 3 toward the dummy transparent substrate 4 (within the shadowed portion 3A), resulting in a loose state, i.e., the reflective layer 2 closely contacted with the transparent substrate 1 is microscopically displaced toward the dummy transparent substrate 4. Accordingly, the watermark is formed in the adhesive layer 3.

For instance, upon curing the liquid ultraviolet rays curing resin in the shadowed portion 3A, there may generate a microscopic space 6 between a surface 4b of the dummy transparent substrate 4 and the adhesive layer 3, because the upper surface of the ultraviolet rays curing resin closely contacted with the surface 4b of the dummy transparent substrate 4 is pulled inside of the adhesive layer 3, while a close contacting state of the reflective layer 2 becomes a loose contacting state.

Upon building the watermark in the optical disc A, it is possible to record the information as follows.

For example, on the production process of the optical disc, the watermark is fully changed at every production lot, for instance, every 100 sheets, 1,000 sheets or 10,000 sheets as a production lot.

The relationship between the production lot and the watermark can be used to specify a certain production lot of mass-produced optical discs among many production lots in the distribution channels to the market by only watching the watermark of one of them.

As a result, when a production defect occurs at a specific production lot, it is possible to effectively and securely withdraw all the optical discs belonging to the specific production lot in the distribution channels by only observing the watermark of the optical disc.

Further, it is not always necessary to change the whole watermark at every production lot but a part of the watermark successively at every production lot.

For instance, a watermark may be built in the adhesive layer 3 along with a serial number, wherein the serial number is increased by 1 at every production lot.

Needless to say, the serial number may be replaced with, for instance, alphabetical letters, Japanese hirakana or katakana letters.

The effect thereof is the same as that of the previously mentioned method, thus, the description is omitted here.

As mentioned in the foregoing, there may be producing methods of the optical disc according to the present invention as follows.

(1) Optical disc producing method utilizing a light shielding mask.

(2) Optical disc producing method utilizing no light shielding mask.

(1) Producing Method Utilizing a Light Shielding Mask

As shown in FIG. 12, in the producing method utilizing the light shielding mask 15, the light shielding mask 15 is placed above the surface of the dummy transparent substrate 4 of the optical disc A and the ultraviolet rays are irradiated on the optical disc A through the light shielding mask 15. The watermark is formed corresponding to a light shielding member 15a and a blank portion 15b of the light shielding mask 15. Both the light shielding member 15a and the blank portion 15b thereof form pictures, letters, symbols and numerals, each having a size capable of being visually observed.

(2) Producing Method Utilizing no Light Shielding Mask.

In this method, instead of preparing a separate light shielding mask, light shielding members 15a for forming the marks, pictures, letters, symbols and numerals corresponding to a watermark are provided directly on at least one of the surfaces 4a, 4b of the dummy transparent substrate 4 of the optical disc A.

When a reversal (negative) watermark thereof is desired, the blank portions 15b designed to have the marks, picture, letters, symbols and numerals are directly provided on one of the surfaces 4a, 4b. Then, the ultraviolet rays are irradiated over the surface 4a of the dummy transparent substrate 4, resulting in the watermark in the adhesive layer 3 of the optical disc A.

Meanwhile, on the light shielding mask 15 mentioned in the foregoing, the light shielding member 15a of the mark, picture, letter, symbol and numeral is written or printed in black, blue or red ink, or the light shielding member 15a made of a film sheet or a paper sheet having a shape of the mark, picture, letter, symbol and numeral is bonded or laminated thereon.

When the light shielding member 15a is printed in black ink on the light shielding mask 15, or the light shielding member 15a made of a paper sheet having black color is tightly bonded or laminated thereon, a complete light shielding state can be obtained. As a result, when the ultraviolet rays are irradiated over the light shielding mask 15, a shape of the light shielding member 15a is clearly projected to the shadowed portion 3A of the adhesive layer 3.

On the other hand, when the light shielding member 15a is printed in ink (blue, red, green, yellow or white) other than black ink on the light shielding mask 15, or the light shielding member 15a made of a paper sheet having a color other than black color is imperfectly bonded or placed thereon, a perfect light shielding state can not be obtained.

As a result, when the ultraviolet rays are irradiated over the light shielding mask 15, the light shielding member 15a causes the shadowed portion 3A of the adhesive layer 3 to have different darkness depending on a light transmittance of the light shielding member 5a, which is subject to the color, material, a bonding state and a placement state of the light shielding member 5a. The gradation of the watermark can be changed by changing the wavelength and/or the transmittance of the light (the ultraviolet rays) which is needed to cure the ultraviolet curing resin.

Figure 19:
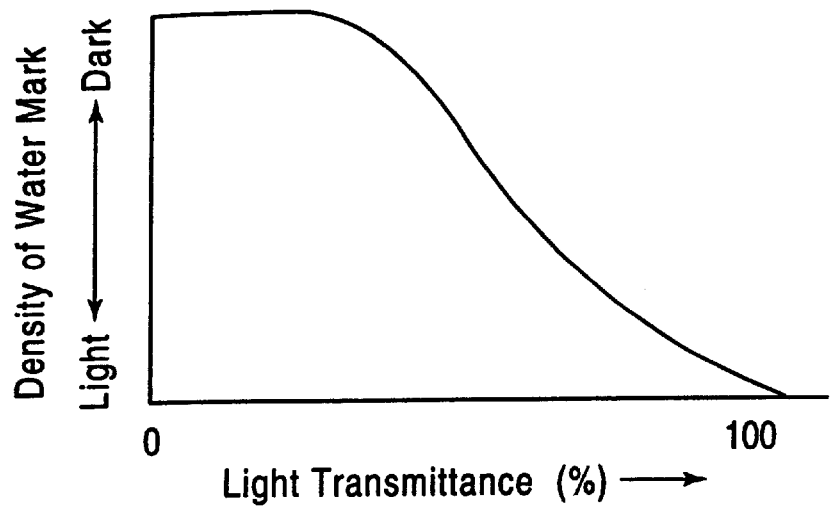
FIG. 19 is a graph showing a relation between the light transmittance for the ultraviolet rays and a density of the watermark.

In other words, the darkness or lightness of the watermark is determined by the light transmittance of the light shielding member as shown in FIG. 19.

FIG. 19 is a graph for explaining a relation between a light transmittance of the ultraviolet rays of the light shielding member 5a and a density of the watermark formed in the optical disc A.

Generally, the ultraviolet rays curing resin can be cured by using the ultraviolet rays having a wavelength of not more than 450 nm (a wavelength of ultraviolet rays region).

In FIG. 19, the abscissa indicates the light transmittance of the light shielding member 5a for the ultraviolet rays of not more than 450 nm wavelength, the ordinate indicates the resultant darkness of the watermark. As shown, when the light transmittance of the shielding member 15a is zero, the resulted watermarks becomes darkest, for the reason that the shadowed portion 3A takes a longer time to cure developing a higher stress therein.

When a lighter watermark is desired, the light transmittance of the light shielding member 15a is made to be increased. In order to control the light transmittance, the color of the light shielding member 15a may be changed form pure black to other color to allow more light to pass therethrough.

As mentioned in the foregoing, there may be developed the space 6 between the adhesive layer 3 and the dummy transparent substrate 4 corresponding to the stress distribution developed in the bonding surface of the optical disc A. The thicknesses of the transparent substrate 1 and the dummy transparent substrate 4 are both 0.6 mm, and the light shielding mask 15 provided with the light shielding member 15a has such a spectrum characteristic as the light transmittance of 10% with respect to the ultraviolet rays having a wavelength not more than 450 nm.

Next, a description is given of ultraviolet rays curing apparatuses of a sixth embodiment to a twelfth embodiment of the present invention, which are used for the optical disc reproducing apparatuses.

Sixth Embodiment of an Ultraviolet Rays Curing Apparatus

Figure 13:
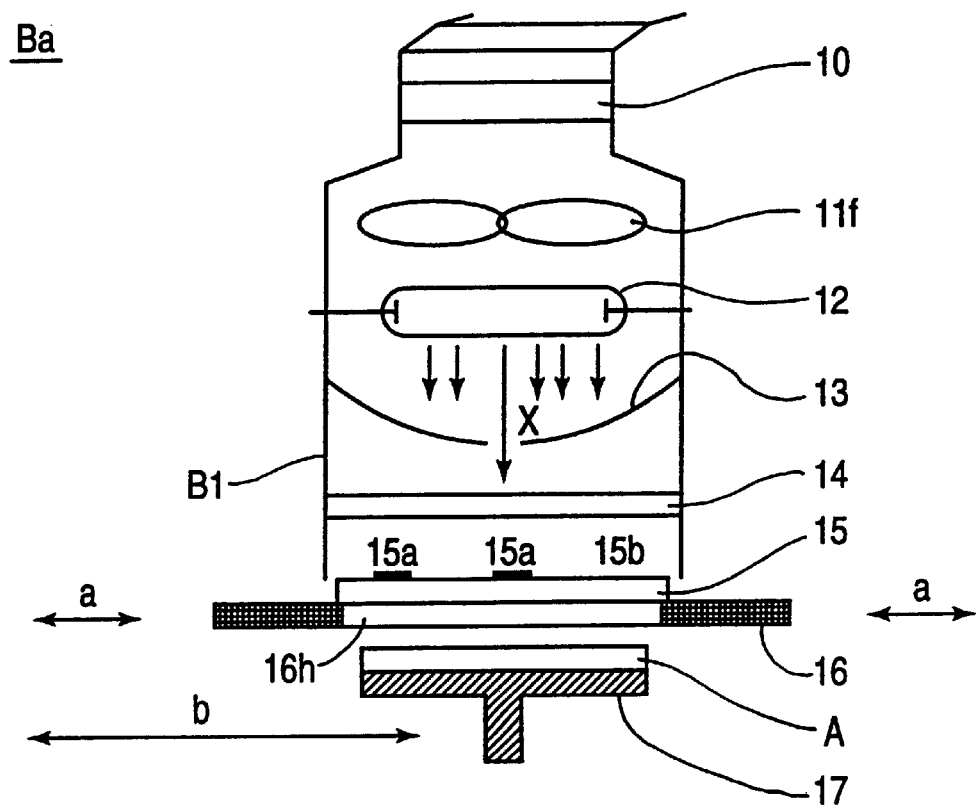
FIG. 13 is a schematic view of an ultraviolet rays curing apparatus of a sixth embodiment of the present invention.

FIG. 13 is a schematic view of an ultraviolet rays curing apparatus of a sixth embodiment of the present invention.

As shown in FIG. 13, an ultraviolet rays curing apparatus Ba of a sixth embodiment of the present invention comprises an exhaust duct 10, an exhaust fan 11f for discharging the air from the apparatus Ba, an ultraviolet rays lamp 12, an ultraviolet rays shutter 13 for opening and closing an optical path x of the ultraviolet rays, a thermic rays cutting filter 14 for filterring out the thermic rays emitted from the ultraviolet rays lamp 12, a mask tray 16 for mounting the light shielding mask 15 having the light shielding member 15a, a table 17 for mounting an optical disc A comprised of the transparent substrate 1 and the dummy transparent substrate 4 bonded together with a liquid ultraviolet rays curing resin, a table transfer mechanism (not shown) for transferring the optical disc A from a bonding process of the optical disc A to the table 17 and transferring the optical disc A to the subsequent process, and a cylindrical vessel B1.

The mask tray 16 for the light shielding mask 15 is defined with a hole 16h located over the optical disc A. The hole 16h of the mask tray 16 has a diameter to allow the ultraviolet rays to irradiate the optical disc A uniformly. The mask tray 16 is freely transferred to the cylindrical vessel B1 in a direction shown with an arrow a. An arrow shown with b designates a transferring direction of the table 17.

As mentioned in the foregoing, the light shielding mask 15 is detachably mounted and fixed on the mask tray 16. Thus, upon changing the watermark for every production lot, it is possible to take out the mask tray 16 from the cylindrical vessel B1 and to change the watermark without disassembling the apparatus Ba.

Seventh Embodiment of an Ultraviolet Rays Curing Apparatus

In order to change the watermark for every production lot, it needs the mask tray 16 having a structure capable of changing various light shielding masks 15.

Figure 14:
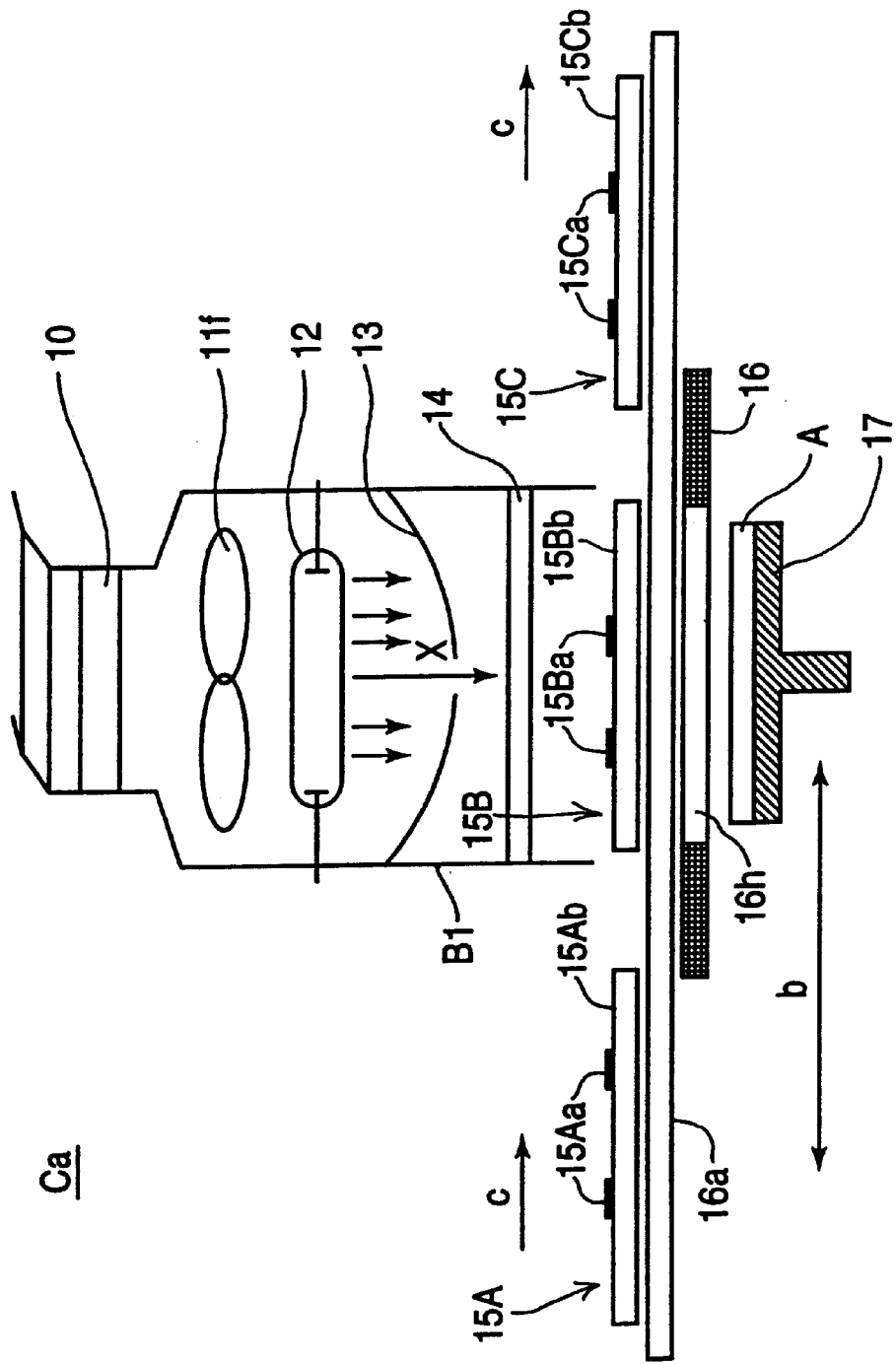
FIG. 14 is an ultraviolet rays curing apparatus of a seventh embodiment of the present invention.

FIG. 14 is an ultraviolet rays curing apparatus of a seventh embodiment of the present invention.

As shown in FIG. 14, an ultraviolet rays curing apparatus Ca of a seventh embodiment of the present invention is the same structure as that of the sixth embodiment shown in FIG. 13 except for a new addition of a light shielding mask transfer mechanism (referred to as mask transfer mechanism) 16a, wherein like parts are shown with like reference characteristics in the sixth embodiment, and the detailed description is omitted for simplicity.

The ultraviolet rays curing apparatus Ca is provided with the mask transferring mechanism 16a capable of linearly transferring a plurality of light shielding masks 15A, 15B, 15C, . . . for forming different watermarks from each other. The mask transferring mechanism 16a is provided above the mask tray 16 for mounting the light shielding mask 15.

The mask transferring mechanism 16a has the same construction as that of a belt conveyer, and transfers the plurality of light shielding masks 15A, 15B, 15C, . . . mounted on the belt conveyer from left to right (in a direction shown with an arrow c) to a predetermined position responsive to a control signal of a control device (not shown).

Each of the plurality of light shielding masks 15A, 15B, 15C, . . . has a light shielding member 15Aa, (15Ba, 15Ca, . . . ) of a mark, a picture, a letter, a symbol or a numeral capable of being visually observed as the watermark.

When a specific watermark is desired to be formed in the optical disc, the mask transferring mechanism 16a transfers a corresponding light shielding mask to a position above the hole 16h of the mask tray 16 and stops it thereon correctly by a control signal outputted from the control device (not shown), resulting in that the mask tray 16 is positioned precisely above the hole 16h of the mask tray 16.

After that, when other watermark is desired, the mask transferring mechanism 16a transfers a corresponding light shielding mask to the hole 16h of the mask tray 16 and stops responsive to a control signal from the control device. Thus, the light shielding mask is positioned correctly over the hole of the mask tray 16.

As mentioned above, the light shielding mask can be changed in a short time, if necessary.

The ultraviolet rays curing apparatus Ca irradiates the ultraviolet rays x on the bonded optical disc A mounted on the table 17 through one of the light shielding masks 15A, 15B, 15C, . . . and the hole 16h of the mask tray 16 with uniform irradiation.

As a result, it is possible to obtain a desired watermark in the optical discs by linearly displacing a necessary light shielding masks 15A, 15B, 15C . . . , on the mask transferring mechanism 16a and transferring one of the masks to the mask tray 16, wherein the mask is securely positioned on the mask tray 16.

Eighth Embodiment of an Ultraviolet Rays Curing Apparatus

Figure 15:
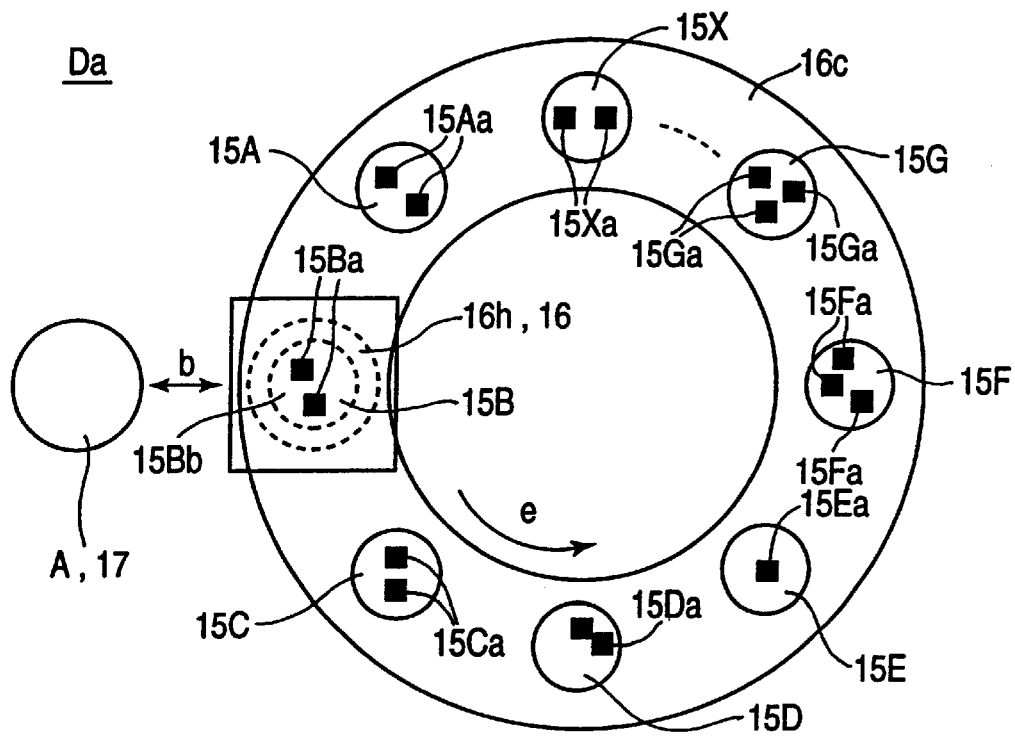
FIG. 15 is a schematic plan view for explaining an ultraviolet rays curing apparatus of the eighth embodiment of the present invention.

FIG. 15 is a schematic plan view for explaining an ultraviolet rays curing apparatus of the eighth embodiment of the present invention.

As shown in FIG. 15, the ultraviolet rays curing apparatus Da in the eighth embodiment has the same construction as that of the ultraviolet rays curing apparatus Ca of the seventh embodiment except for the mask transfer mechanism 16c.

In the apparatus Da, the mask transfer mechanism 16a of the apparatus Ca in the seventh embodiment is replaced with a mask transfer mechanism 16c having a circular shape (an index table), wherein like components are shown with like reference characters, and the detailed description is omitted.

Referring to FIG. 15, in the ultraviolet rays curing apparatus Da, a plurality of light shielding masks 15A, 15B, 15C, 15D, 1SE, 15F, 15G, . . . , 15X for forming different watermarks from each other are provided on the mask transfer mechanism 16c. The mask transfer mechanism 16c is disposed over the mask tray 16 apart therefrom at a predetermined space, and circularly transfers one of the plurality of light shielding masks 15A, 15B, 15C, 15D, 15E, 15F, 15G . . . , 15X over the mask tray 16 in a counterclockwise direction shown with an arrow e, to allow it to stop at a predetermined position responsive to a control signal outputted from a control device (not shown). On the light shielding masks 15A, 15B, 15C, 15D, 15E, 15F, 15G, . . . , 15X, there are formed light shielding members 15Aa, 15Ba, 15Ca, 15Da, 15Ea, 15Fa, 15Ga, . . . , 15Xa for forming marks, pictures, letters, symbols and numerals, respectively. Each of them has a size capable of being visually observed as a watermark.

When a specific watermark is desired to be formed, the mask transfer mechanism 16c transfers one of the light shielding masks (15A–15X) corresponding to the specific watermark to a predetermined position over the hole 16h of the mask tray 16 and stops it after precisely positioning it responsive to a control signal from the control device (not shown), resulting in a precise disposition of the light shielding masks over the hole 16h of the mask tray 16.

After that, when another watermark is desired to be formed, the mask transfer mechanism 16c transfers another one among the light shielding masks (15A–15X) corresponding to the desired watermark to the predetermined position over the hole 16h of the mask tray 16 and stops it after precisely positioning it, resulting in a precise disposition of the light shielding mask over the hole 16h of the mask tray 16 responsive to a control signal from the control device (not shown).

As mentioned above, the desired light shielding mask can be changed in a short time.

Then, the ultraviolet rays curing apparatus Da irradiates an ultraviolet ray uniformly on the optical disc A mounted on the table 17 through one of the plurality of light shielding masks 15A, 15B, 15C, 15D, 15E, 15F, 15G, . . . , 15X, and the hole 16h of the mask tray 16.

Accordingly, it is possible to form a different watermark for every production lot by circularly disposing the light shielding masks 15A, 15B, 15C, 15D, 15E, 15F, 15G, . . . , 15X on the mask transfer mechanism 16c corresponding to the necessary kinds of the watermarks, and by transferring one of them corresponding to a specific production lot to the predetermined position over the hole 16h of the mask tray 16 by the rotation of the mask transfer mechanism 16c.

Generally, when the distance between the light shielding mask 15 and the optical disc A mounted on the table 17 is too large, the ultraviolet rays passing through the light shielding mask 15 tend to go around the light shielding members, then reach the optical disc A. Thus, the watermark formed in the optical disc A becomes vague. Therefore, it is preferable to position the light shielding mask 15 over the optical disc A mounted on the table 17 as close as possible without contacting to each other.

In order to find an optimum distance, it is preferable to control the best position of both the optical disc A and the light shielding mask 15 to prevent the vagueness of the watermark by optionally displacing them in an upper or lower direction when the ultraviolet rays curing apparatuses Ba, Ca and Da are operated.

Ninth Embodiment of an Ultraviolet Rays Curing Apparatus

Figure 16:
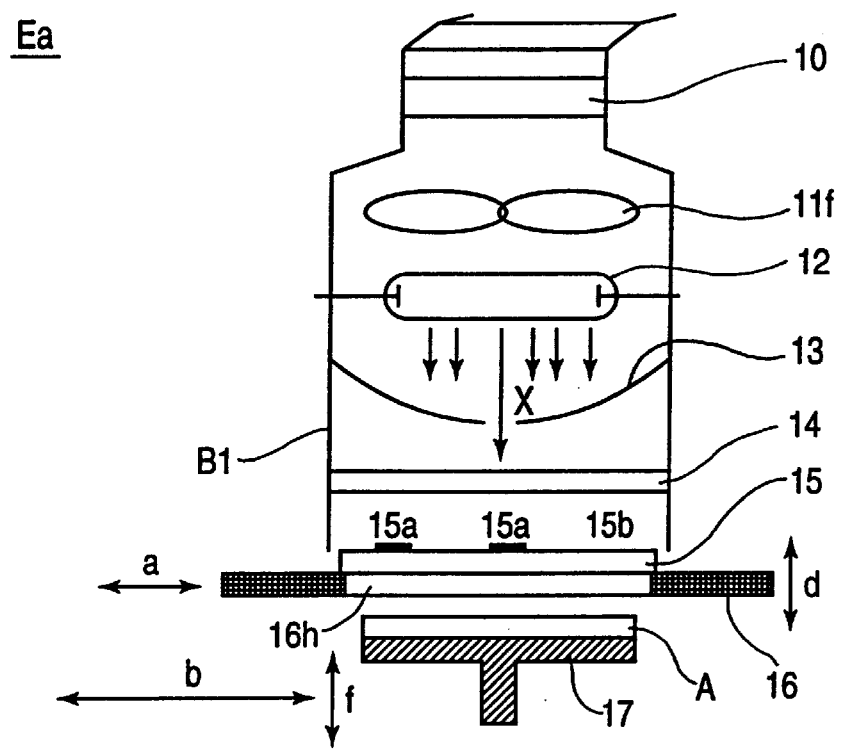
FIG. 16 is a schematic view of an ultraviolet rays curing apparatus of a ninth embodiment of the present invention.

FIG. 16 is a schematic view of an ultraviolet rays curing apparatus of a ninth embodiment of the present invention.

The description is given of an ultraviolet rays curing apparatus Ea of a ninth embodiment of the present invention referring to FIG. 16, wherein the mask tray 16 and the table 17 of the ultraviolet curing apparatus Ba shown in FIG. 13 are independently adjustable in directions shown with an arrow d and an arrow f.

Thereby, it is possible to adjust the best positions of mask tray 16 and the optical disc A by displacing one of them or both of them in the directions d and/or f, even when the light shielding mask 15 mounted on the mask tray 16 and the optical disc mounted on the table 17 are largely away from each other, resulting in a secure prevention of vagueness of the watermark.

Tenth Embodiment of an Ultraviolet Ray Curing Apparatus

Figure 17:
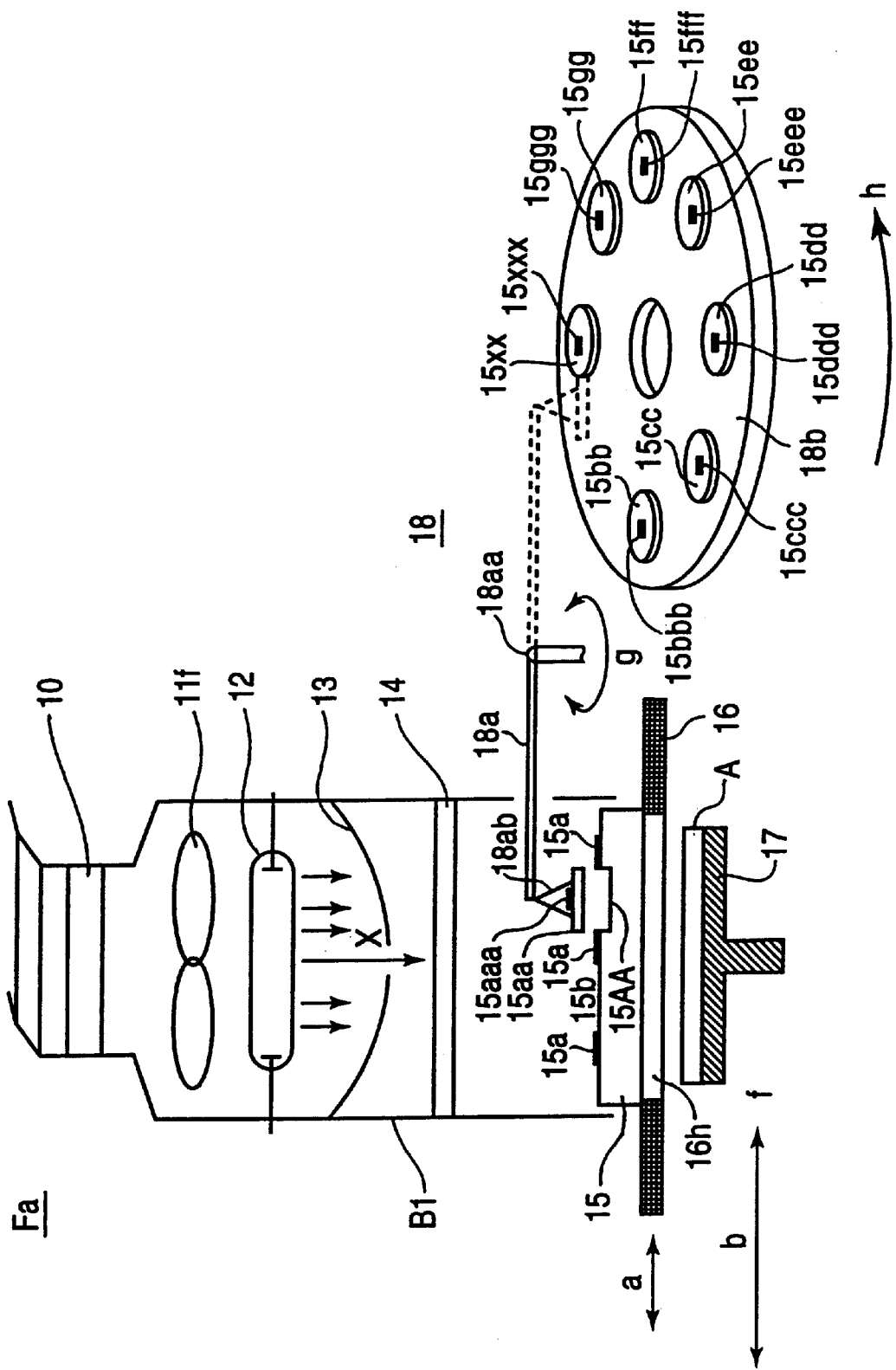
FIG. 17 is a schematic view of an ultraviolet rays curing apparatus of a tenth embodiment of the present invention.

FIG. 17 is a schematic view of an ultraviolet rays curing apparatus of a tenth embodiment of the present invention.

The description is given of an ultraviolet rays curing apparatus Fa of the tenth embodiment of the present invention, referring to FIG. 17, wherein the apparatus Fa of the tenth embodiment has the same construction as that of the ultraviolet rays curing apparatus Ba shown in FIG. 13 except for a partial light shielding mask change transfer mechanism (referred to as a partial mask transfer mechanism) 18 for the light shielding mask, which mechanism 18 is newly added to the apparatus Ba. Thus, like parts are shown with like reference characters in the apparatus Ba and the detailed description is omitted here.

Referring to FIG. 17, the light shielding mask 15 used in the ultraviolet rays curing apparatus Fa of the tenth embodiment comprises the light shielding member 15a for forming a most part of the watermark and a fitting section 15AA for changeably mounting a partial light shielding mask (referred to as a partial mask) 15aa (15bb, 15cc, 15dd, 15ff, 15gg, . . . , or 15xx) for changing a part of the watermark.

The fitting section 15AA of the light shielding mask 15 has a recess shape to allow the partial mask 15aa (15bb, 15cc, 15dd, 15ee, 15ff, 15gg, . . . , or 15xx) to be securely fitted thereto.

In the fitting section 15AA, there is detachably mounted a specific partial mask selected from a plurality of the partial masks 15aa, 15bb, 15cc, 15dd, 15ee, 15ff, 15gg, . . . , 15xx by being transferred.

Each of the partial masks 15aa, 15bb, 15cc, 15dd, 15ee, 15ff, 15gg, . . . , 15xx has a light shielding member 15aaa, 15bbb, 15ccc, 15ddd, 15eee, 15fff, 15ggg, . . . , or 15xxx correspondingly therewith such as a mark, a picture, a letter, a symbol, or a numeral, each having a size capable of being visually observed, as a part of the watermark.

Specifically, when one of serial numbers is desired to successively be formed in each of the watermarks of the plural optical discs A as a part of the watermark, such light shielding members as including a numeral [1], [2], [3], [4], [5], [6], [7], . . . , respectively, are successively formed on the partial masks 15aa, 15bb, 15cc, 15dd, 15ee, 15ff, 15gg, . . . , 15xx, correspondingly therewith.

On the other hand, the partial mask transfer mechanism 18 comprises an arm 18a and a partial mask mounting section 18b. On the partial mask mounting section 18b, there are circularly mounted a plurality of the partial masks 15aa, 15bb, 15cc, 15dd, 15ee, 15ff, 15gg, . . . , 15xx. The partial mask mounting section 18b is rotated in a counterclockwise direction shown with an arrow h in FIG. 17.

The arm 18a rotates at an axis 18aa in directions shown with an arrow g to swing between the light shielding mask 15 mounted on the mask tray 16 and the partial mask mounting section 18b. At a distal end of the arm 18a, there is provided a suction cup 18ab for detachably holding one of the partial masks 15aa, 15bb, 15cc, 15dd, 15ee, 15ff, 15gg, . . . , 15xx easily.

Next, the description is given of the operation of the ultraviolet rays curing apparatus Fa in the case where the partial mask 15aa mounted on the fitting section 15AA of the light shielding mask 15 is replaced with another partial mask 15bb.

It should be noted that the same is true in the case where either of the partial masks 15aa, 15bb, 15cc, 15dd, 15ee, 15ff, 15gg, . . . , 15xx is replaced with another one.

First, the partial mask mounting section 18b is rotated in the direction h and stopped by a control signal from the control section (not shown) in response to a manner that the partial mask 15aa mounted thereon is positioned under the suction cup 18ab of the arm 18a.

Next, the suction cup 18ab of the arm 18a holds the partial mask 15aa mounted on the partial mask mounting section 18b and the arm 18a hangs the partial mask 15aa responsive to a control signal from the control section (not shown).

After that, the arm 18a hanging the partial mask 15aa is rotated in the direction shown with the arrow g to transfer the partial mask 15aa over the fitting section 15AA of the light shielding mask 15 and stops. Then, the arm 18a gradually goes down until the partial mask 15aa is securely fitted in the fitting section 15AA of the light shielding mask 15.

After the partial mask 15aa is securely fitted in the fitting section 15AA of the light shielding mask 15, the ultraviolet rays are irradiated on the optical disc A through the light shielding mask 15 as mentioned in the foregoing.

Thereby, there is formed a watermark corresponding to the light shielding member 15a forming most parts of the watermark and the partial mask 15aa forming a rest of the watermark.

In the same method as mentioned in the foregoing, the partial mask 15bb can be securely positioned in the fitting section 15AA of the light shielding mask 15 by the partial mask transfer mechanism 18, resulting a watermark corresponding to the light shielding member 15a forming most parts of the watermark and the partial mask 15bb forming a part of the watermark instead of the partial mask 15aa.

It is necessary to transfer the partial masks 15aa, 15bb, 15cc, 15ee, 15ff, 15gg, . . . , or 15xx to the ultraviolet rays curing apparatuses Da, Fa, Ba, Ca, or Ea before an ultraviolet rays shutter 13 is opened. In addition, it is necessary to remove the partial masks 15aa, 15bb, 15cc, 15ee, 15ff, 15gg, . . . , or 15xx from the ultraviolet rays curing apparatuses Da, Fa, Ba, Ca, or Ea after the ultraviolet rays shutter 13 is closed.

Incidentally, taking account of the flatness of the transparent substrate 1 and the dummy transparent substrate 4, the mask tray 16 may be omitted when they are made of a flat glass. In this case, it is possible to form the watermark by positioning the light shielding mask 15 extremely close to the optical disc A.

Next, the description is given of an embodiment thereof.

Eleventh Embodiment of an Ultraviolet Rays Curing Apparatus

Figure 20:
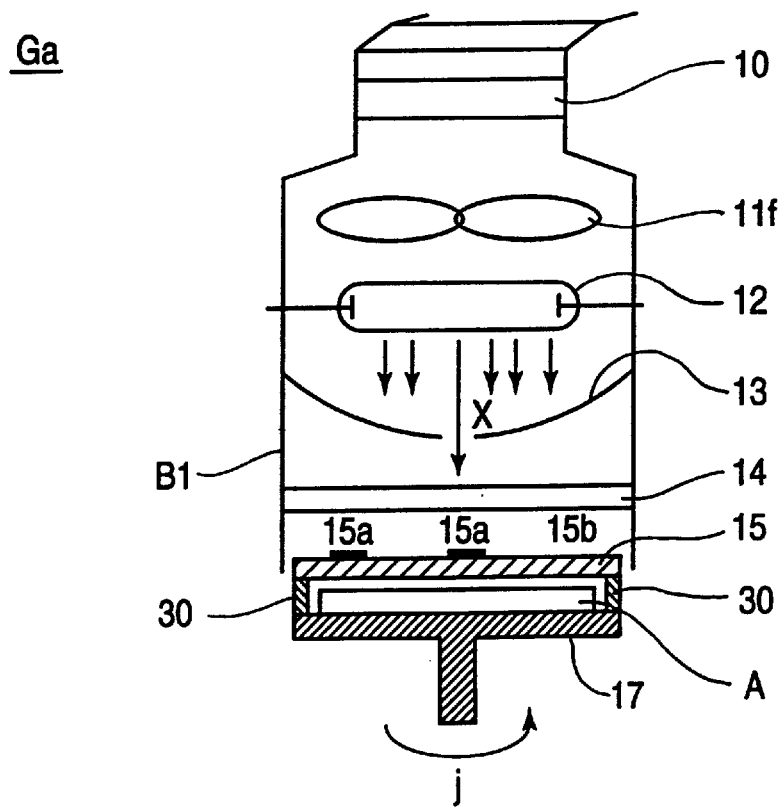
FIG. 20 is a schematic view of an ultraviolet rays curing apparatus of a eleventh embodiment of the present invention.

FIG. 20 is a schematic view of an ultraviolet rays curing apparatus of a eleventh embodiment of the present invention.

As shown in FIG. 20, in an ultraviolet rays curing apparatus Ga of the eleventh embodiment of the present invention, the mask tray 30 for mounting the light shielding mask 15 is detachably or fixedly provided on the table 17. This construction is the same as that of the ultraviolet rays curing apparatus Ba (FIG. 13) except for the mask tray 16, which mask tray 16 is replaced with the mask tray 30.

Like parts are shown with like reference characters in FIG. 13. Thus, the description is omitted here. Further, upon irradiating the ultraviolet rays, the table 17 is rotated in the direction shown with an arrow j to perform uniform the irradiation of the ultraviolet rays.

Twelfth Embodiment

Figure 21:
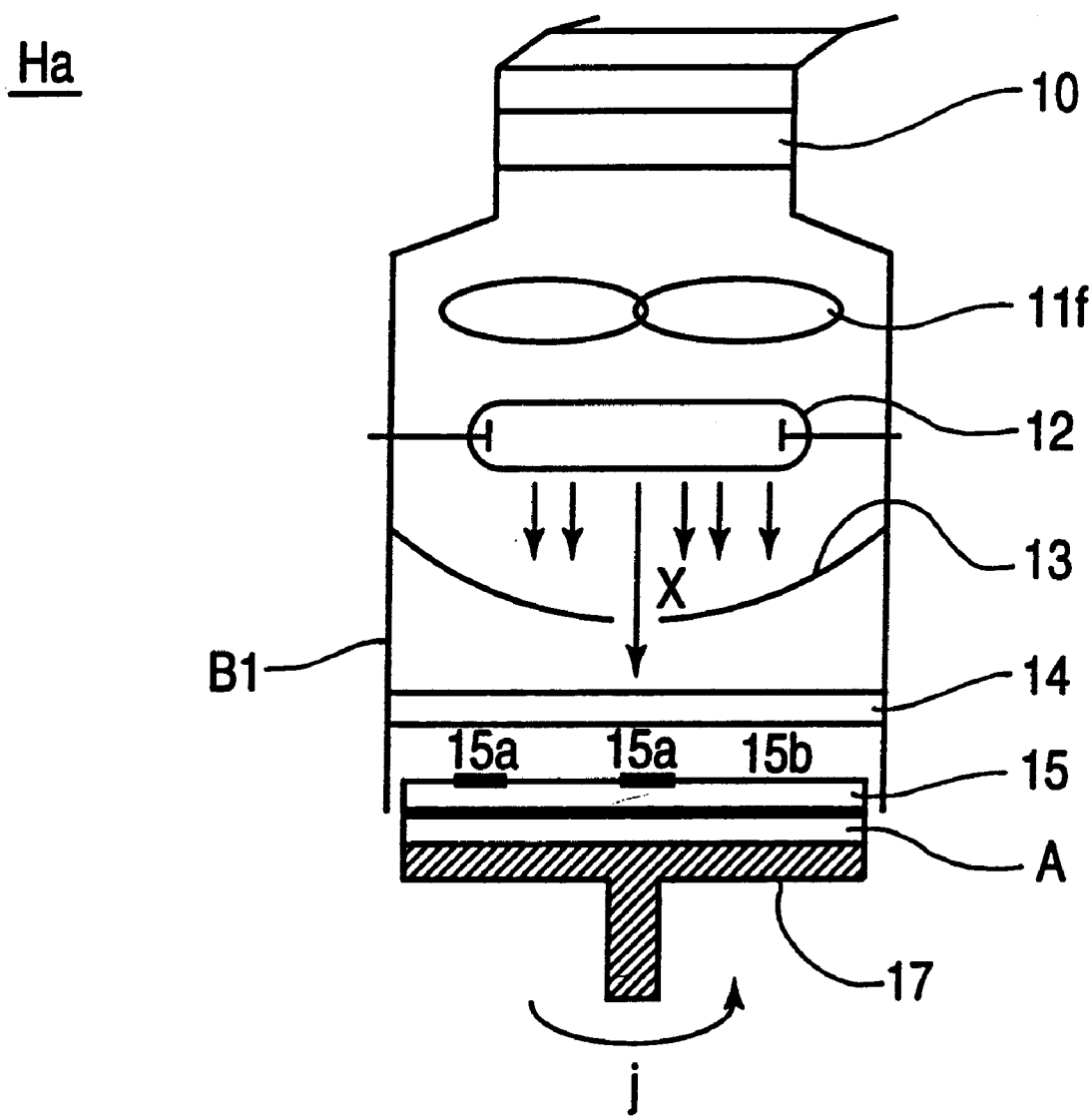
FIG. 21 is a schematic view of an ultraviolet rays curing apparatus of a twelfth embodiment of the present invention.

FIG. 21 is a schematic view of an ultraviolet rays curing apparatus of a twelfth embodiment of the present invention.

As shown in FIG. 21, in an ultraviolet rays curing apparatus Ha of the twelfth embodiment of the present invention, the mask tray 30 shown in FIG. 20 for mounting the light shielding mask 15 is removed from the table 17, and the light shielding mask 15 is directly mounted on the optical disc A.

This construction is the same as that of the ultraviolet rays curing apparatus Ga (FIG. 20) without the mask tray 30.

Like parts are shown with like reference characters in FIG. 20. Thus, the description is omitted here. Further, upon irradiating the ultraviolet rays, the table 17 is rotated in the direction shown with an arrow j to perform uniform irradiation of the ultraviolet rays.

Next, the description is given of the method for developing light and dark portions in the watermark.

Various kinds of the light shielding masks 15 are formed as follows.

(1) Three quartz glass plates each having a thickness of 1 mm and a diameter of 140 mm are prepared, and on one of them a Japanese kanji character [haru or spring] is written in black ink, on another one a Japanese kanji character [natsu, or summer] in blue ink, and on the rest a Japanese kanji character [aki or autumn] in yellow ink.

It is possible to change the light transmittance of the written characters for the ultraviolet rays by changing the color of ink to be used. Thereby, it is possible to change the light and dark portions of the watermark.

Further, in order to change the light transmittance for the ultraviolet rays, it is possible to change a thickness of the ink layer.

FIG. 19 is a graph showing a relation between the light transmittance of the masking members for the ultraviolet rays and a darkness of the watermark.

As seen from FIG. 19, as the light transmittance for the ultraviolet rays is decreased, the watermark becomes dark. On the contrary, as the light transmittance of thereof is increased, the watermark becomes light.

On the other hand, as the watermark becomes dark, the waveform of reproduction output signal in a high frequency is largely disturbed when the optical disc A is reproduced, resulting in impossibility of a normal reproduction.

Accordingly, it is preferable to determine a value of the light transmittance for the ultraviolet rays by confirming the reproduced waveform.

FIGS. 18(A) to 18(D) are schematic view for explaining constructions of various kinds of the light shielding masks.

Figure 18A:
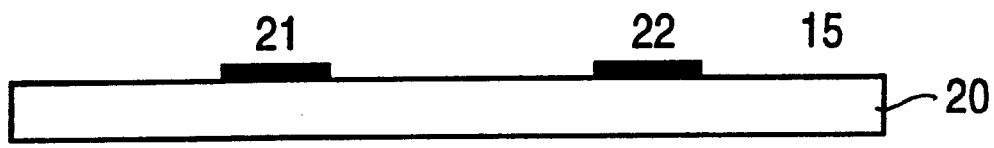
FIGS. 18(A) to 18(D) are schematic views for explaining constructions of various kinds of the light shielding masks.

As mentioned in the foregoing, the optical discs A having different watermarks and darkness of [haru or spring], [natu or summer] and [aki or autumn] are shown in FIG. 18(A), wherein a reference character 20 designates a quarts glass sheet and 21, 22 light shielding members for forming the watermark having different darkness.

Figure 18B:

In the light shielding mask 15 shown in FIG. 18(B), a transparent film 23 is used instead of the quarts glass plate.

Figure 18C:
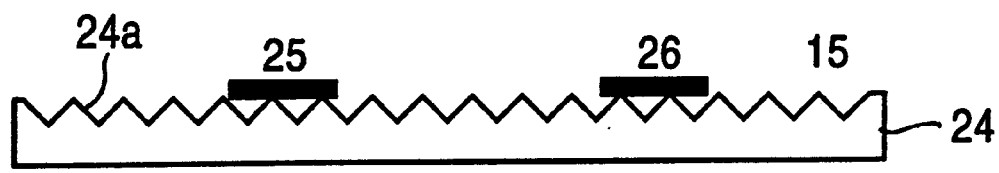

(2) As shown in FIG. 18(C), on a surface of a frosted glass plate 24 having minute irregularities 24a thereon, alphabetic letters [A B C] are written in transparent ink or liquid ink, resulting in the light shielding mask 15. In this light shielding mask 15, the light transmittance for the ultraviolet rays of the letter portions 25, 26 is increased compared with that of crystal glass having no irregularities.

Shadowing condition is different from ones mentioned in the item (1).

However, the watermark was obtained as well as ones mentioned in the case (1). The optical reproduction output was slightly disturbed, but not so much as disturbing the normal reproduction of the optical disc A.

Figure 18D:

Further, as shown in FIG. 18(D), it is possible to make a light shielding mask by making recesses 28, 29 corresponding to the watermark on a transparent glass plate 27, and filling the recesses 28, 29 with a light shielding member.

Each of the optical discs formed with the watermarks by using the light shielding masks 15 shown in FIGS. 18(A), 18(B), 18(C) and 18(D) was separated into the two substrates, and a replica was produced from the information signal recorded surface 1a of the transparent substrate 1 of every optical disc. However, the watermark was extinct therefrom.

Further, a reproduction signal waveform from each of the optical discs A was inputted to an optical modulation device of a cutting machine to make a replica of the optical disc A in the normal optical disc production process. However, the watermark could not be observed.

According to the optical disc having the constructive features mentioned in the foregoing, the optical disc producing method and the apparatus for reproducing the optical disc, it is possible to prevent the forgery of the watermark formed between an information signal recorded surface of the transparent substrate and an surface of the dummy transparent substrate without having physical uneven steps in the optical disc, and the watermark is disappeared upon an attempt of making a forgery of the optical disc.

Thus, it is possible to distinguish the optical discs of forgery from genuine ones by only visually observing the information signal recorded surface having recording tracks formed spirally or coaxially from the reproduction side of the optical disc if the watermark is formed or not therein. This contributes to distinguish forgeries from genuine ones in the market.

A customer can confirm if the optical disc he or she is buying is a forgery or genuine before purchasing it.

Further, it is possible to eliminate optical discs of forgery from the market.

What is claimed is:

1. An optical disc producing method for producing an optical disc comprising a transparent substrate having an information signal recorded surface, a reflective layer formed on the information signal recording surface thereof, an adhesive layer formed on the reflective layer and a dummy transparent substrate on the adhesive layer stacked in this order, the method comprising the steps of:

forming the reflective layer on the information signal recorded surface of the transparent substrate;

coating an adhesive on the reflective layer to form the adhesive layer, wherein a curing speed of the adhesive is changeable according to a controlled amount of irradiation of electromagnetic radiation rays;

disposing the dummy transparent substrate on the transparent substrate sandwiching the reflective layer and the adhesive layer;

disposing a mask member over a top surface of the dummy transparent substrate, wherein the mask member has a specific masking pattern for partially shielding the electromagnetic radiation rays; and irradiating the electromagnetic radiation rays on the adhesive layer through the mask member to cause the adhesive to be cured by controlling an amount of irradiation of the electromagnetic radiation corresponding to the specific masking pattern, whereby a position of the reflective layer is microscopically and partially displaced corresponding to the specific masking pattern from an original position of the reflective layer, and thus displaced reflective layer visually exhibits a watermark having the specific masking pattern after the adhesive is cured.

2. An optical disc producing method as claimed in claim 1, wherein the specific shape includes at least one selected from a group consisting of a mark, a picture, a letter, a symbol and a numeral.

3. An optical disc producing method for producing an optical disc comprising a transparent substrate having an information signal recorded surface, a reflective layer formed on the information signal recorded surface thereof, an adhesive layer formed on the reflective layer and a dummy transparent substrate on the adhesive layer stacked in this order, the method comprising the steps of:

forming the reflective layer on the information signal recorded surface of the transparent substrate;

coating an adhesive on the reflective layer to form the adhesive layer, wherein a curing speed of the adhesive is changeable according to a controlled amount of irradiation of electromagnetic radiation rays;

disposing the dummy transparent substrate on the transparent substrate sandwiching the reflective layer and the adhesive layer;

forming a mask pattern directly on a top surface of the dummy transparent substrate, wherein the mask pattern has a specific shape partially shields the electromagnetic radiation rays; and irradiating the electromagnetic radiation rays on the adhesive layer through the mask pattern formed on the dummy transparent substrate to cause the adhesive to be cured by being controlled of an amount of irradiation of the electromagnetic radiation rays corresponding to the specific shape, whereby a position of the reflective layer is microscopically and partially displaced corresponding to the specific shape from an original position of the reflective layer;

and thus displaced displacement of the reflective layer visually exhibits a watermark having the specific shape after the adhesive is cured.

4. An optical disc producing method as claimed in claim 3, wherein the specific shape includes at least one selected from a group consisting of a mark, a picture, a letter, a symbol and a numeral.

5. An optical disc producing method for producing an optical disc comprising a transparent substrate having an information signal recorded surface, a reflective layer formed on the information signal recorded surface thereof, an adhesive layer formed on the reflective layer, a mask layer on the adhesive layer and a dummy transparent substrate on the mask layer stacked in this order, the method comprising the steps of:

forming the reflective layer on the reflective layer of the transparent substrate;

coating an adhesive on the information signal recorded surface to form the adhesive layer, wherein a curing speed of the adhesive is changeable according to a controlled amount of irradiation of electromagnetic radiation rays;

disposing the dummy transparent substrate on the adhesive layer sandwiching the mask layer therebetween, wherein the mask layer has a specific pattern for partially shielding the electromagnetic radiation rays; and irradiating the electromagnetic radiation rays on the adhesive layer through the mask layer to cause the adhesive to be cured by controlling an amount of irradiation of the electromagnetic radiation rays corresponding to the specific pattern, whereby a position of the reflective layer is microscopically displaced corresponding to the specific pattern, and thus displaced reflective layer visually exhibits a watermark having the specific pattern after the adhesive is cured.

6. An optical disc producing method as claimed in claim 5, wherein the specific pattern includes at least one selected from a group consisting of a mark, a picture, a letter, a symbol and a numeral.

7. An optical disc producing method as claimed in claim 5, wherein the specific pattern is formed as unevenness.

8. An optical disc producing method as claimed in claim 7, wherein the specific pattern formed as unevenness includes at least one selected from a group consisting of a mark, a picture, a letter, a symbol and a numeral.

9. An optical disc producing method as claimed in claim 7, wherein the unevenness is printed on one surface of the dummy transparent substrate.

10. An optical disc producing method as claimed in claim 9, wherein the adhesive is made of an ultraviolet rays curing resin.

11. An optical disc producing method for producing an optical disc comprising a first substrate having an information signal recorded surface, a reflective layer formed on the information signal recorded surface thereof, an adhesive layer formed on the reflective layer, mask means having masking members and a second substrate, the method comprising the steps of:

forming the reflective layer on the information signal recorded surface of the first substrate;

coating an adhesive on the reflective layer to form the adhesive layer, wherein a curing speed of the adhesive is changeable according to a controlled amount of irradiation of electromagnetic radiation rays;

disposing the second substrate on the first substrate sandwiching the reflective layer and the adhesive layer;

disposing mask means having the mask members on one surface of the second substrate;

irradiating the electromagnetic radiation rays on the adhesive through the mask means to cause the adhesive to be cured by controlling the curing speed of the adhesive responsive to existence and nonexistence of the mask members, whereby a watermark is recorded in the optical disc corresponding to the existence and nonexistence of the mask members after the adhesive is cured.

12. An optical disc producing method as claimed in claim 11, wherein the mask means is supported with holding means and an exchange of the mask means is performed by replacing the holding means with another holding means supporting another mask means.

13. An optical disc producing method as claimed in claim 12, wherein the watermark is recorded at an optional position in the optical disc by adjusting the position of the holding means.

14. An optical disc producing method as claimed in claim 11, wherein a plurality of the mask means are mounted on transferring means and one of the plurality of the mask means is selectively transferred to the optical disc to record the watermark corresponding to a pattern of the mask means transferred thereto.

15. An optical disc producing method as claimed in claim 11, wherein the mask member includes, at least, one selected from a group of a mark, a picture, a letter, a symbol and a numeral.

16. An optical disc producing method as claimed in claim 11, wherein the mask means has a structure capable of replacing a part of the mask means with at least one of the mask members.

17. An optical disc producing method as claimed in claim 16, wherein one of the mask members has a shape including, at least, one selected from a group of a mark, a picture, a letter, a symbol and a numeral.

18. An optical disc producing method as claimed in claim 17, wherein the one of the mask members has a shape including, at least, one selected from a group of numerals, 1, 2, 3, 4, 5, 6, 7, 8, 9, 0, and when the part of the mask means is replaced with another one of the mask members, numeral selected for the watermark is made continuous to a number included in the part of the mask means used before replacement thereof.

19. An optical disc producing method as claimed in claim 11, wherein the optical disc is mounted on disc mounting means, and the optical disc is rotated to receive uniform irradiation of the electromagnetic radiation rays.

20. An optical disc producing method as claimed in claim 19, wherein the watermark is recorded at an optional position in the optical disc by adjusting a position of the disc mounting means.

21. An optical disc production apparatus for producing an optical disc comprising a first substrate having an information signal recorded surface, a reflective layer formed on the information signal recorded surface thereof, an adhesive layer formed on the reflective layer, and a second substrate on the adhesive layer stacked in this order, the adhesive layer made of an adhesive of which curing speed is changed according to a controlled amount of irradiation of an electromagnetic radiation rays, the apparatus comprising:

an electromagnetic radiation rays source;

mask means provided with mask members for partially shielding the electromagnetic radiation rays emitted from the electromagnetic radiation rays source; and disc mounting means for mounting the optical disc;

wherein a watermark is recorded in the optical disc by irradiating the electromagnetic radiation rays on the adhesive through the mask means to cause the adhesive to be cured by controlling the curing speed of the adhesive corresponding to an existence and nonexistence of the mask members.

22. An optical disc production apparatus as claimed in claim 21, further comprising:

a shutter for opening and closing an optical path of the electromagnetic radiation rays from the electromagnetic radiation rays source, and a thermic rays cutting filter for filterring out thermic rays in the optical path and providing the electromagnetic radiation rays without containing the thermic rays to the mask means.

23. An optical disc production apparatus as claimed in claim 21, further comprising:

holding means for holding the mask means, wherein an exchange of the mask means is performed by replacing the holding means with another mask means supporting another mask means.

24. An optical disc production apparatus as claimed in claim 23, wherein the watermark is recorded at an optional position in the optical disc by adjusting the position of the disc holding means.

25. An optical disc production apparatus as claimed in claim 21, wherein the apparatus further comprises mask transferring means for mounting and transferring a plurality of the mask means thereon, and one of the plurality of the mask means is selectively transferred to the optical disc to record the watermark corresponding to a selected mask means by the mask transferring means.

26. An optical disc production apparatus as claimed in claim 25, wherein the mask transferring means is one selected from a group of a circular table and a linear conveyer.

27. An optical disc production apparatus as claimed in claim 21, wherein the mask members include, at least, one selected from a group of a mark, a picture, a letter, a symbol, and a numeral.

28. An optical disc production apparatus as claimed in claim 21, wherein the mask means has a construction that a part of the mask means is changeable with another mask member.

29. An optical disc production apparatus as claimed in claim 28, wherein a plurality of mask members are mounted on the mask transferring means and one of the plurality of mask members replaces another mask member previously mounted on the mask means by the mask transferring means.

30. An optical disc production apparatus as claimed in claim 28, wherein said another mask member has a shape including, at least, one selected from a group of a mark, a picture, a letter, a symbol and a numeral.

31. An optical disc production apparatus as claimed in claim 28, wherein said mask member has a shape including, at least, one selected from a group of numerals, 1, 2, ,3, 4, 5, 6, 7, 8, 9, 0, and when the part of the mask means is replaced with another one of the mask members, numeral selected for the watermark is made continuous to a number in the part of the mask means used before replacement thereof.

32. An optical disc production apparatus as claimed in claim 21, wherein the disc mounting means is rotatably constructed to allow the optical disc to be irradiated with the electromagnetic radiation rays uniformly.

33. An optical disc production apparatus as claimed in claim 21, wherein the watermark is recorded at an optional position in the optical disc by adjusting a position of the disc mounting means.

34. An optical disc produced according to the optical disc production apparatus defined in claim 21.

35. An optical disc produced according to the optical disc production apparatus defined in claim 28.

36. An optical disc produced according to the optical disc producing method defined in claim 11.

* * * * *